(12) United States Patent
Wood et al.

(10) Patent No.: US 11,428,206 B2
(45) Date of Patent: Aug. 30, 2022

(54) AEROFOIL TIP STRUCTURE, PARTICULARLY FOR A HAWT ROTOR BLADE

(71) Applicant: ANAKATA WIND POWER RESOURCES LTD, Oxford (GB)

(72) Inventors: Ben David Wood, Oxford (GB); Nicholas James Arnett Gaudern, Oxford (GB)

(73) Assignee: ANAKATA WIND POWER RESOURCES LTD, Oxfordshire (GB)

( * ) Notice: Subject to any disclaimer, the term of this patent is extended or adjusted under 35 U.S.C. 154(b) by 30 days.

(21) Appl. No.: 17/052,284

(22) PCT Filed: Apr. 30, 2019

(86) PCT No.: PCT/EP2019/061113
§ 371 (c)(1),
(2) Date: Nov. 2, 2020

(87) PCT Pub. No.: WO2019/211304
PCT Pub. Date: Nov. 7, 2019

(65) Prior Publication Data
US 2021/0088026 A1 Mar. 25, 2021

(30) Foreign Application Priority Data
May 2, 2018 (GB) ..................... 1807253

(51) Int. Cl.
*F03D 1/06* (2006.01)
(52) U.S. Cl.
CPC ......... *F03D 1/0675* (2013.01); *F03D 1/0641* (2013.01); *F05B 2240/122* (2013.01); *F05B 2240/30* (2013.01); *F05B 2260/97* (2013.01)

(58) Field of Classification Search
CPC ... F03D 1/0675; F03D 1/0641; F05B 2260/97
See application file for complete search history.

(56) References Cited

U.S. PATENT DOCUMENTS 2,846,165 A    8/1958  Axelson
6,142,738 A *  11/2000 Toulmay ............... B64C 27/463
                                                    416/223 R
(Continued)

FOREIGN PATENT DOCUMENTS

CN    203362391 U    12/2013
CN    106089572 A    11/2016
(Continued)

OTHER PUBLICATIONS

International Search Report for corresponding application PCT/EP2019/061113 filed Apr. 30, 2019; dated Jul. 23, 2019.

*Primary Examiner* — Courtney D Heinle
*Assistant Examiner* — Ryan C Clark
(74) *Attorney, Agent, or Firm* — Cantor Colburn LLP

(57) ABSTRACT

A tip structure may be arranged for example on a rotor blade (12) of a HAWT (10). The tip structure comprises a pressure side structure (50) arranged on a pressure side (43) of the blade, and a suction side structure (60) arranged on a suction side (44) of the blade (12). The pressure side and suction side structures (50, 60) have different pitch angles ($\alpha P, \alpha S$) so that the chord (CP2) of the pressure side structure (50) extends forwardly in the direction of motion (D) and relatively more radially outwardly away from the blade root, or less radially inwardly towards the blade root, than the chord (CS2) of the suction side structure (60), defining a relative twist angle ($\alpha T$) between the two structures (50, 60).

25 Claims, 20 Drawing Sheets

(56) References Cited

U.S. PATENT DOCUMENTS

| | | | |
|---|---|---|---|
| 9,103,325 B2* | 8/2015 | Koegler | F03D 1/0675 |
| 10,415,542 B2* | 9/2019 | Rohden | F03D 1/0633 |
| 2004/0061029 A1* | 4/2004 | McCarthy | B64C 23/072 |
| | | | 244/199.4 |
| 2007/0025856 A1* | 2/2007 | Moroz | F03D 1/0675 |
| | | | 416/223 R |
| 2009/0084904 A1* | 4/2009 | Detert | B64C 23/065 |
| | | | 244/199.4 |
| 2009/0302167 A1* | 12/2009 | Desroche | B64C 9/18 |
| | | | 244/199.4 |
| 2011/0024552 A1* | 2/2011 | Patt | B64C 27/463 |
| | | | 244/6 |
| 2012/0217754 A1* | 8/2012 | Fukami | F03D 1/0633 |
| | | | 290/55 |
| 2014/0346281 A1* | 11/2014 | Gratzer | B64C 23/069 |
| | | | 244/199.4 |
| 2015/0003994 A1* | 1/2015 | Braaten | F03D 1/0633 |
| | | | 416/237 |
| 2016/0009379 A1* | 1/2016 | Witte | B64C 5/08 |
| | | | 244/1 A |
| 2017/0218777 A1* | 8/2017 | Church | F03D 1/0633 |
| 2017/0370345 A1* | 12/2017 | Keeley | F03D 1/0633 |

FOREIGN PATENT DOCUMENTS

| | | |
|---|---|---|
| EP | 0094064 A1 | 11/1983 |
| EP | 2990643 A1 | 3/2016 |
| ES | 2338963 A1 | 5/2010 |
| JP | 2004084590 A | 3/2004 |
| KR | 20130064466 A | 6/2013 |
| WO | 2015001090 A1 | 1/2015 |

* cited by examiner

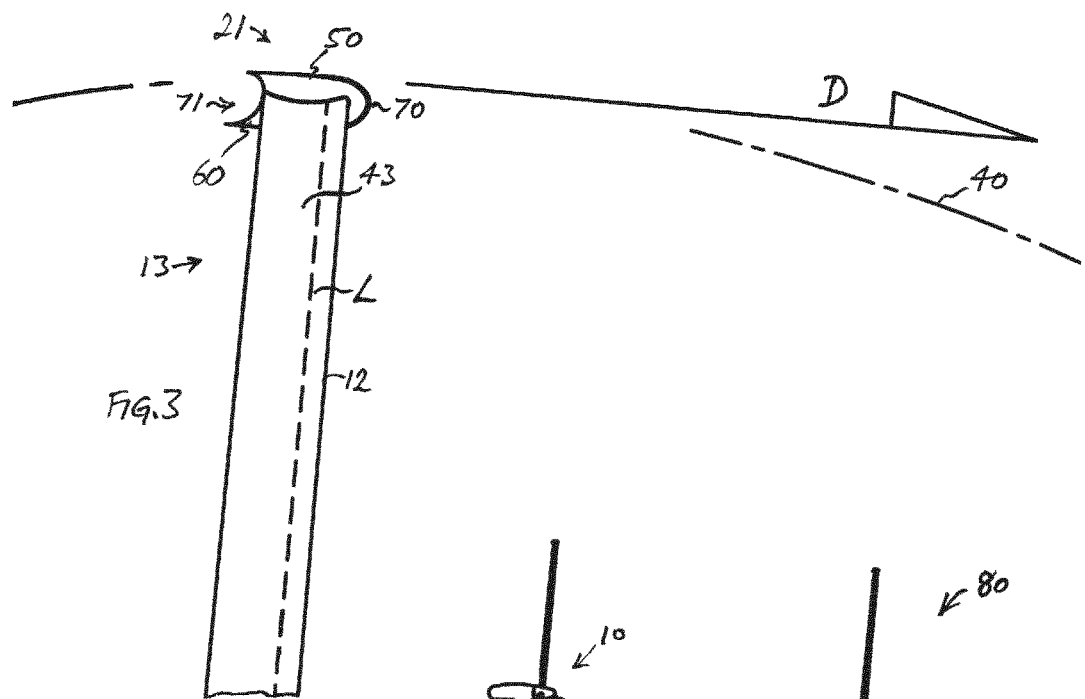
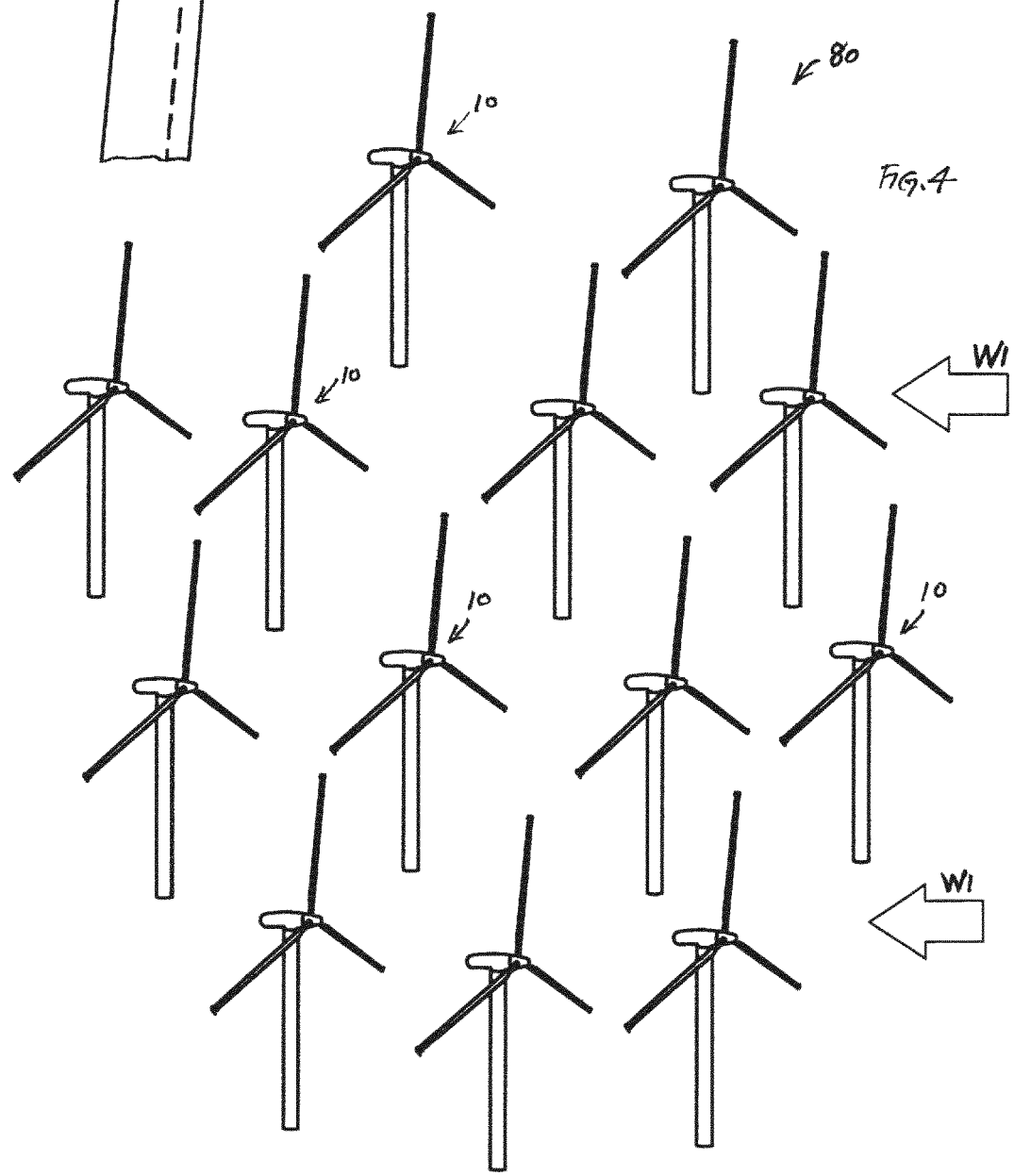

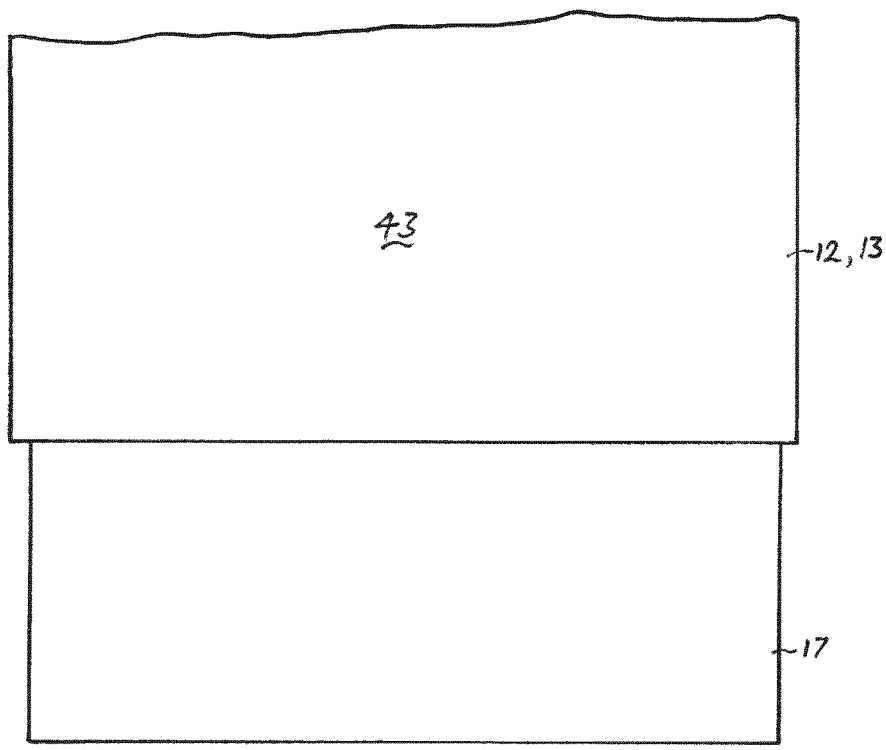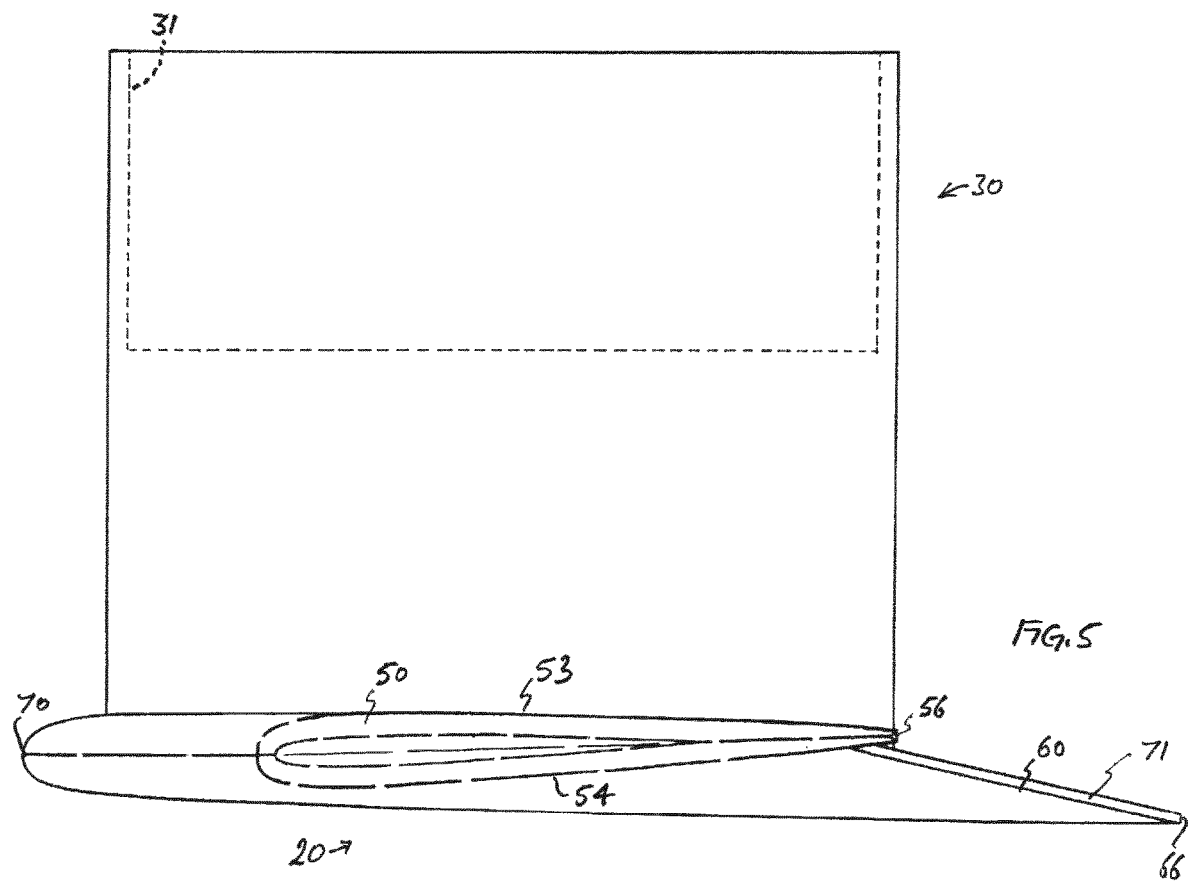
FIG. 5

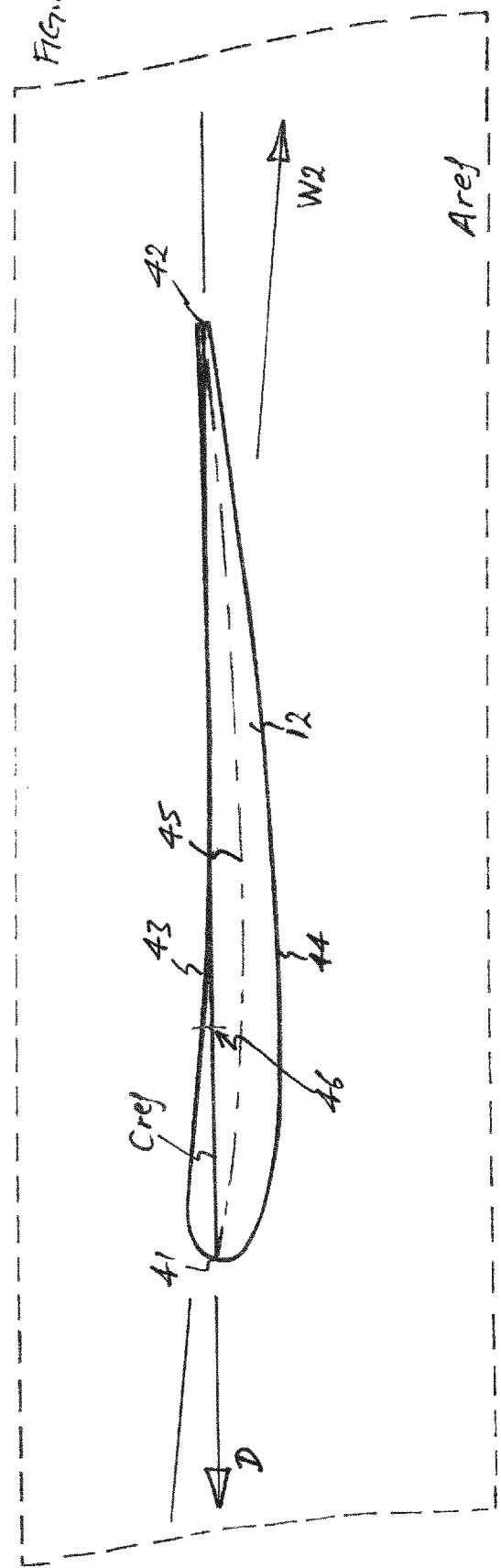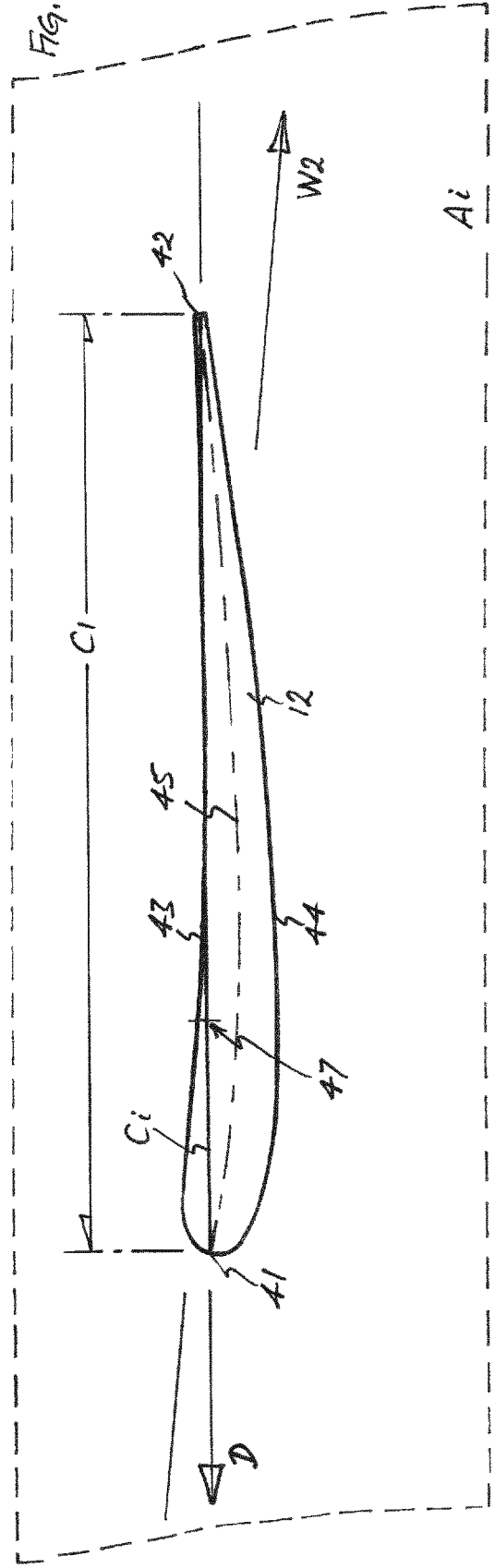

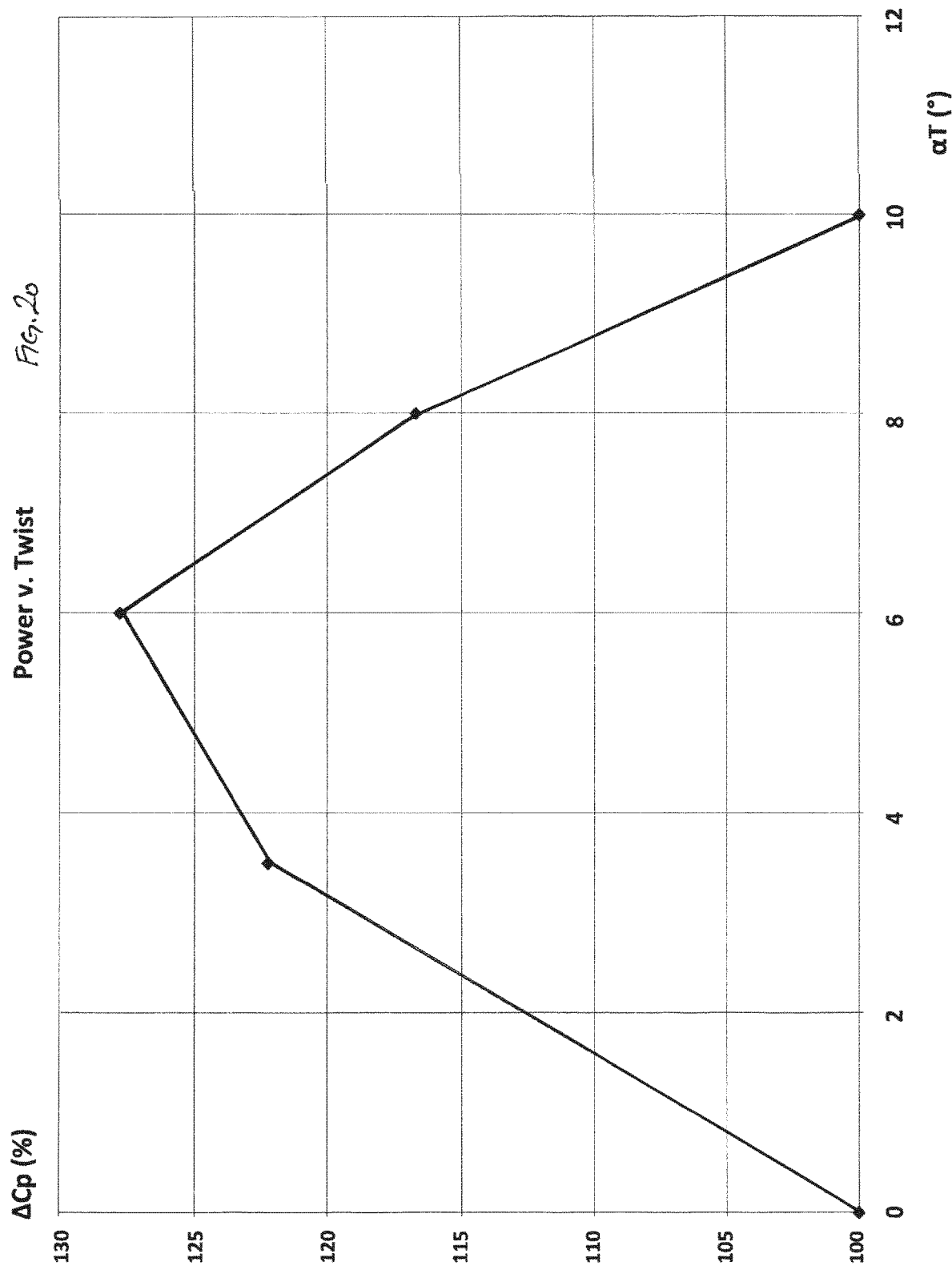

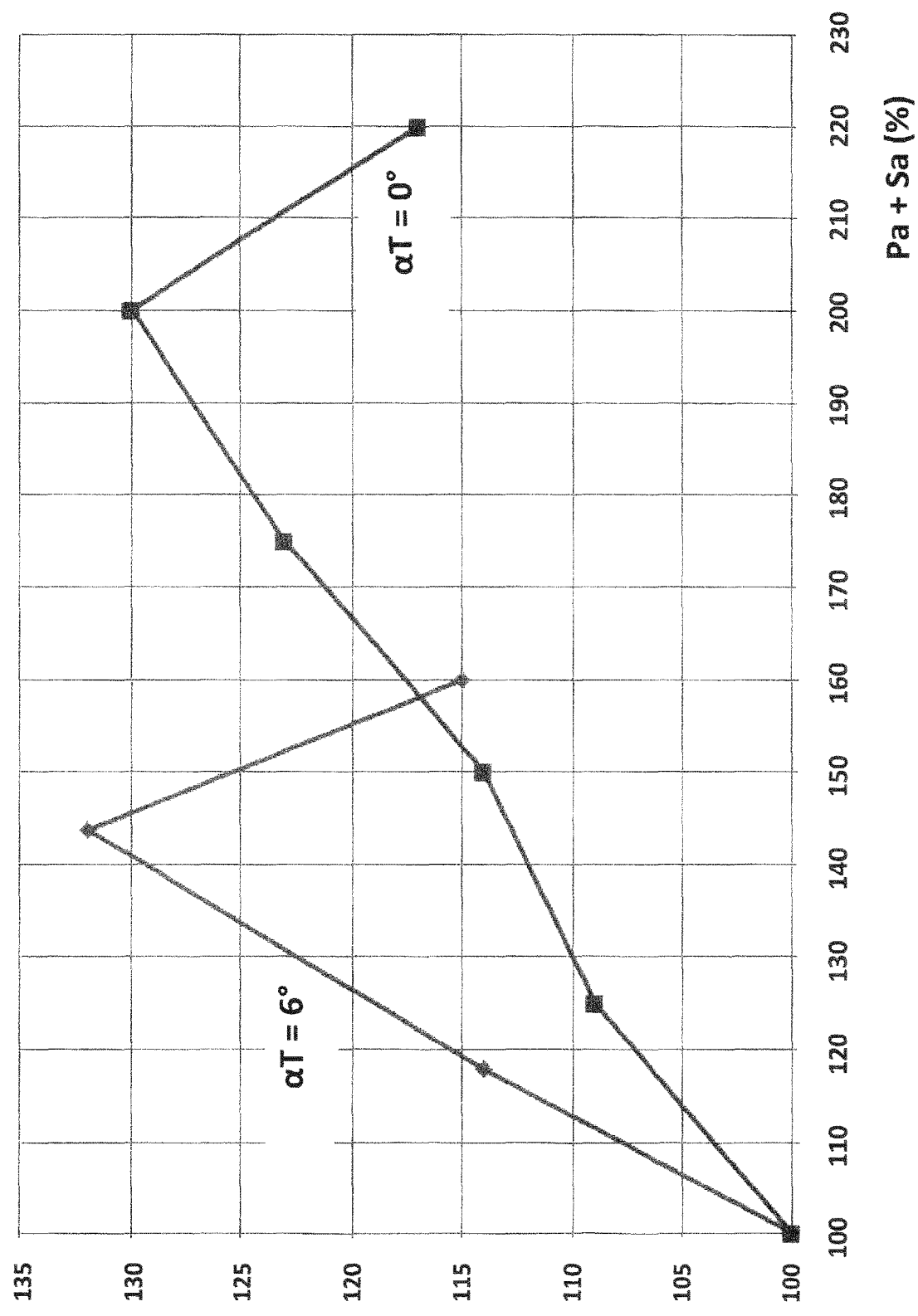

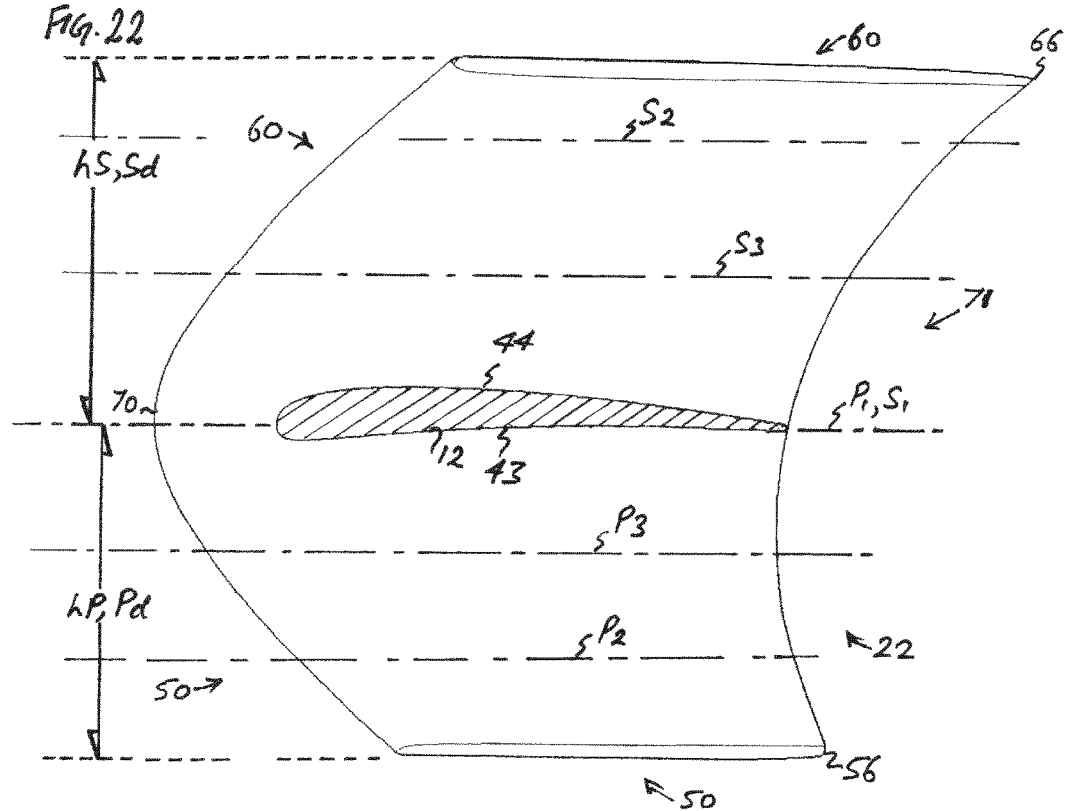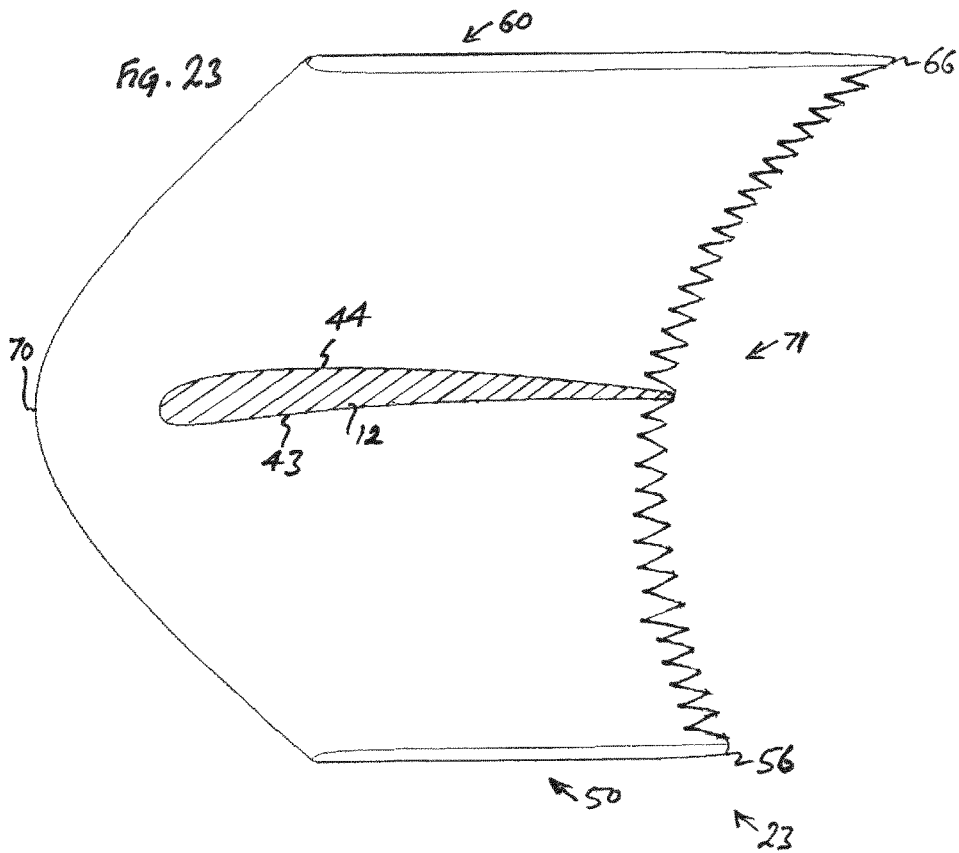

AEROFOIL TIP STRUCTURE, PARTICULARLY FOR A HAWT ROTOR BLADE

This invention is directed to aerofoils, particularly although not exclusively rotor blades, most particularly rotor blades for horizontal axis wind turbines (HAWTs).

Most modern commercial wind generators (i.e. wind turbines that generate electricity) are horizontal axis wind turbines (HAWTs) with lift-based rotors—which is to say, the rotor blades are aerofoils which rotate at a tip speed higher than the wind speed. The air flowing over the aerofoil generates lift (a force normal to the direction of the relative wind, i.e. the mean direction of the air impinging on the blade as it rotates), which drives the rotor in rotation.

The blade of a HAWT rotor extends radially outwardly from the hub to the tip. As the radial distance from the hub increases, the tangential speed of the blade also increases and so the direction of the relative airflow moves progressively away from the direction of the wind (which flows through the rotor along the axis of rotation) to oppose the rotational direction of the blade. For this reason, the blade is usually somewhat twisted along its length axis, with the leading edge turning progressively towards the direction of rotation with increasing distance from the hub, to maintain an optimal angle of attack (the angle of the chord of the aerofoil relative to the airflow).

The aerofoil profile is shaped to generate a pressure differential between the downwind (lower pressure or "suction") side of the blade and the upwind (higher pressure or "pressure") side of the blade. The pressure differential across the blade appears as a force acting on the blade in a direction normal to the direction of the relative airflow, referred to as lift. The lift force includes two vector components which in this specification are referred to respectively as thrust and torque.

The thrust component acts along the direction of the axis of rotation and so, if the rotor is arranged upwind of a supporting structure, pushes the blades towards the supporting structure. The blades must be sufficiently stiff to resist the thrust force and maintain a safe tip clearance, although some prebend (a progressive curvature in the upwind direction towards the blade tip) will compensate for a lighter, more flexible construction.

The torque component urges the blades in the direction of rotation and is converted into shaft power at the rotation axis. Thus, a general objective of wind turbine rotor design is to maximise torque relative to thrust. The angle of attack is selected to achieve this objective.

The air flowing over the blades gives rise to reaction forces, referred to collectively as drag, which act on the blades in a direction opposed to the direction of rotation. Drag includes, inter alia: induced drag, which results from the deflection of the air flowing over the blade and so may be regarded as the counterpart of lift; and parasitic drag, which includes, inter alia, skin friction as the air flows over the surface of the blade. Drag consumes some of the useful torque and thus reduces the output shaft power of the rotor. Thus, another general objective is to maximise the ratio of lift relative to drag, also known as the glide ratio.

The aerofoil profile defines inter alia the ratio of blade thickness to chord length and is selected together with the angle of attack to optimise the glide ratio.

As the blades rotate, the pressure differential across the upwind and downwind sides of each blade causes the air to flow around the blade from the higher pressure, upwind side to the lower pressure, downwind side. Most of the flow is along the direction of the chord, i.e. in the width direction of the blade, from its leading edge to its trailing edge, hence contributing to generate the pressure differential which produces the lift and hence the torque which drives the blade in rotation.

However, some of the flow is along the length direction of the blade, radially outwardly away from the hub towards the tip, and around the tip of the blade from the higher pressure, upwind side to the lower pressure, downwind side. This flow reduces the differential pressure across the upstream and downstream sides of the blade and hence reduces lift in the region near the blade tip. The air is shed from the blade tip to form a vortex which trails behind the blade, the formation of the vortex consuming some of the rotational energy of the rotor and thus contributing to induced drag.

Thus, in order to maintain lift and to reduce drag and so increase the proportion of the torque which is converted to useful shaft power, it is desirable to suppress as far as possible the flow of air in the radially outward or length direction around the tip of the blade.

The rotor solidity—which is to say, the total area of the rotor blades when projected along the axis of rotation as a proportion of the swept area of the rotor—depends on the number of blades, and, since the chord extends in the direction of rotation, also on the length of the chord. Thus, the fewer the blades, and the shorter the chord, the lower the rotor solidity.

The rotor is designed to rotate at a speed sufficient to extract as much energy as possible from the wind flowing through the swept area of the rotor, while allowing enough time for the turbulent airflow induced by the passage of each blade to flow away from the rotor before the next blade arrives. Thus, the lower the rotor solidity, the higher its rotational speed.

The useful shaft power P produced by a wind turbine rotor is the product of its shaft torque and rotational speed. Ceteris paribus, a higher speed to torque ratio or a lower mass moment of inertia I will reduce the mechanical loading and hence the cost of the wind turbine installation including the drivetrain, bearings, generator and support structure relative to the output shaft power P.

The relatively higher speed to torque ratio of a low solidity rotor is particularly suited to driving an electric generator.

For any given aerofoil profile and rotor diameter, a shorter chord (hence a lower solidity rotor) implies a more slender blade. However, the structural efficiency of the blade is inversely proportional to its slenderness; ceteris paribus, a more slender blade must also be more massive in order to be strong enough and stiff enough for operation in the same service conditions.

Thus, a reduction in rotor solidity resulting in an increase in speed to torque ratio implies a tradeoff in increased mass moment of inertia. In practice, these countervailing design objectives drive the chord length and hence the rotor solidity of a commercial wind generator towards a point of optimal balance between aerodynamic and structural efficiency for its target service conditions.

As a net result of all these design considerations, the rotor of a modern HAWT for wind energy production is characterised by relatively few, slender blades.

A three bladed rotor is found to be more dynamically stable and easier to yaw than one-, two- or four-bladed designs due to its lesser gyroscopic effect, and so most modern commercial HAWTs have a three bladed rotor, typically with a glide ratio of up to 160 or more in the radially outer region of the rotor and a tip speed ratio of around 8 to 10.

The generally accepted design guidelines for wind generators for use in different service conditions are defined by International Standard IEC61400 of the International Electrotechnical Commission of Geneva, Switzerland by reference to the Wind Turbine Generator Classes (WTG Classes) as set out in that Standard. For any given WTG class, a greater mass moment of inertia I requires more strength in the blades, hub, bearings and drivetrain, and so a heavier and more expensive assembly and supporting structure.

The commercial case for a wind turbine installation depends fundamentally on its capital cost per unit of energy generated over its design lifetime. Since the capital cost of a wind turbine installation is critically dependent on the mass moment of inertia of the rotor, it is convenient to define a wind turbine rotor as having a mass efficiency of P/I, wherein P is the average output shaft power produced by the rotor over its part load operating region (i.e. up to its rated windspeed) in the target windspeed range, and I is the mass moment of inertia of the rotor. The commercial choice between two competing HAWT rotor designs in the same WTG Class and having the same number of blades and swept area will thus depend inter alia on their relative mass efficiencies.

Any structural modification of the blade which increases its mass will also increase the mass moment of inertia I of the blade proportionately to the square of the distance of the mass from the axis of rotation. Thus, a relatively slight increase in the length of the blade or the mass of the blade at the tip will have a proportionately much larger effect on the mass efficiency of the rotor than adding a comparable additional mass at the blade root.

Another constraining factor in wind turbine rotor design is the overall diameter of the swept circle at the blade tip, which may be limited by the intended installation site including the permissible overall height of the rotor. As blade length increases, so does (ceteris paribus) the blade deflection at the tip due to thrust. Hence, more prebend or a more rigid construction is required to maintain a safe distance between the blade tip and the tower as the blades bend in the wind.

Aircraft wings resemble wind turbine rotor blades in that they define an aerofoil profile which generates lift, the lift serving to support the weight of the aircraft in flight. Like wind turbine blades, most of the air flows over an aircraft wing generally in the direction of the chord from its leading edge to its trailing edge, contributing to lift. However, some of the air flows in the length direction of the wing from its lower (higher pressure) side to its upper (suction or lower pressure) side, reducing the differential pressure across the upper and lower surfaces of the wing, and is shed from the wingtip to form a vortex which trails behind the wing. The loss of differential pressure reduces lift while the formation of the trailing vortex consumes some of the engine power required to maintain the airspeed of the aircraft and generate lift, and so reduces fuel efficiency.

It is common for aircraft wings to be adapted so that the wingtip comprises a winglet or an endplate, which effectively is a pair of winglets extending respectively on the suction and pressure sides of the aerofoil. The or each winglet defines a plate, sometimes (but not necessarily) having an aerofoil profile, and forms a barrier to air flowing around the wingtip in the length direction of the wing from the lower (high pressure) side of the wing to the upper (suction or low pressure) side of the wing, and so helps to suppress the formation of the trailing vortex at the wingtip.

The added surface area of the winglet generates increased drag due to friction, but is found to produce a net improvement in the glide ratio by producing a relatively more significant reduction in the airflow in the length direction of the wing and so weakening the generation of the vortex at the wingtip. For this reason winglets are found to produce a net improvement in the overall fuel efficiency of the aircraft.

It has frequently been proposed to provide a HAWT rotor blade with a winglet or winglets.

For example, US2015003994 (A1) discloses a HAWT rotor having blades with oppositely directed, arcuate winglets. The winglet on the downwind (suction) side of the aerofoil may be half as long (in the direction of the axis of rotation) as that on the upwind (pressure) side of the aerofoil, to maintain clearance as the blades are deflected towards the supporting tower in use.

WO2015/001090 discloses a HAWT rotor blade having a winglet with a pointed leading edge and a trifurcated trailing edge.

CN106089572 (A) discloses a HAWT rotor blade having winglets extending respectively from the pressure and suction sides of the blade and differently angled with respect to its length axis.

KR20130064466 (A) and JP2004084590 (A) disclose HAWT rotor blades having a suction side winglet or end plate.

As discussed above, wind turbine rotor blade design is a compromise between aerodynamic and structural efficiency, and is based on design criteria markedly different from fixed aerofoil applications such as aircraft wings. Thus, whereas the chord of an aircraft wing may extend for a substantial distance in the length direction of the fuselage, wind turbine rotor design dictates a relatively much shorter chord length and hence a much more slender form factor.

FIGS. 1A and 1B help to illustrate the significance of slenderness when considering the effect of added mass on mass moment of inertia I.

Consider two bodies 1 and 2 of equal mass and centre 3, body 1 being relatively more slender than body 2. (FIG. 1A.)

An additional mass 4 equivalent to 10% of the mass of each body is connected to each of its opposite ends. (FIG. 1B.)

The masses 4 are equal but are further from the centre 3 in the more slender body 1 than in the less slender body 2. Thus it can be appreciated that, ceteris paribus, a mass added to the distal end of a relatively slender body will have a proportionately greater effect on its mass moment of inertia I than an equivalent mass added to the distal end of a less slender body.

The blades of a HAWT are more similar in slenderness and overall form factor to the blades of an aircraft propeller or the rotor blades of a helicopter than to the fixed wing of an aircraft.

Helicopter blades and aircraft propellers typically do not have winglets as aircraft wings do. Similarly in practice, commercial HAWTs typically are not equipped with winglets at the blade tips, because it is found that winglets typically result in a net reduction or, at best, an insignificant improvement in mass efficiency (P/I). Even if the winglet is shaped to form an aerofoil, it is typically found that the benefit of any reduction in lengthwise airflow and vortex generation at the blade tip is largely outweighed by the penalty of the increased mass moment of inertia I and parasitic drag of the winglet in terms of the unit cost of energy over the lifetime of the installation.

In order to offset the increase in mass moment of inertia I it is possible to shorten the blade; however, shortening the blade reduces the swept area of the rotor and so reduces lift and hence output shaft power P.

Thus in practice it is usually found that adding a winglet to the tip of a optimised HAWT rotor blade will reduce or, at best, only marginally increase the mass efficiency of the rotor.

A general objective of the present invention is to improve the efficiency of an aerofoil. More specific embodiments of the invention are directed to improving the mass efficiency P/I of the rotor of a HAWT.

In a first aspect of the invention there is provided a tip structure as defined in the claims.

The tip structure comprises a pressure side structure extending from the pressure side of the aerofoil, and a suction side structure extending from the suction side of the aerofoil. Where the aerofoil is configured as a rotor blade of a HAWT, the tip structure will be attached in use to the free end of the rotor blade so that a section of each structure may be defined in a respective plane P2 or S2 approximately parallel with the plane of rotation.

When considered in the respective plane P2 or S2, with the direction of motion D being represented by a straight line in the respective plane, the chord CP2 of the pressure side structure extends at an angle $\alpha P$ relative to the direction of motion D, while the chord CS2 of the suction side structure extends at an angle $\alpha S$ relative to the direction of motion D.

In accordance with the invention the angle $\alpha P$ is less positive or more negative than the angle $\alpha S$ (which is to say, with respect to the length axis L of the blade, the chord CP2 extends forwardly in the direction of motion D and relatively more radially outwardly away from the blade root, or less radially inwardly towards the blade root, than the chord CS2). A relative twist angle $\alpha T$ is thus defined between the chords CP2, CS2 of the pressure and suction side structures.

In tests on a 1 MW HAWT as further discussed below it was found that the twist angle $\alpha T$ resulted in a surprisingly good real world performance, providing a significant improvement in the key metric of mass efficiency, PP.

In a related aspect, the invention provides a method wherein the tip structure is arranged at a free end region of a rotor blade to improve the mass efficiency P/I of the rotor.

In further aspects the invention provides respectively a rotor blade or aircraft comprising the novel tip structure, a wind turbine or helicopter having a rotor equipped with the novel rotor blade, and a wind farm in which a plurality of the novel wind turbines are arranged in upstream/downstream relation.

Further features and advantages will be appreciated from the following illustrative embodiments of the invention which will now be described, purely by way of example and without limitation to the scope of the claims, and with reference to the accompanying drawings, in which:

FIG. 3 is an enlarged view of one of the tip structures of FIG. 2;

FIG. 4 shows a wind farm comprising a plurality of HAWTs as shown in FIG. 2;

FIGS. 5-18 show the free end region of an aerofoil equipped with a similar tip structure, hereinafter referred to as the first tip structure, according to another embodiment of the invention, wherein:

FIG. 5 is a view looking at the pressure side of the aerofoil and showing how the first tip structure may be configured as a retrofit unit for attachment to the free end region of the aerofoil;

FIG. 6 is an outer side view of the first tip structure, from which it can be seen that the first tip structure comprises a pressure side structure on the pressure side of the aerofoil, and a suction side structure on the suction side of the aerofoil, and showing imaginary, first, second and third pressure side planes P1, P2, P3 and suction side planes S1, S2, S3;

FIG. 7 is a similar view to FIG. 6, illustrating the projected areas Pa and Sa of the pressure and suction side structures;

FIG. 8 is a view looking at the trailing edge of the aerofoil and first tip structure;

FIG. 9 is a view similar to FIG. 8, showing how the pressure and suction side structures may be canted to define a cant angle $\beta P$, $\beta S$ relative to a first reference plane Aref normal to the length axis L of the aerofoil;

FIGS. 10 and 11 are sections through the profile of the aerofoil taken respectively in the first reference plane Aref (FIG. 10) and in an intermediate section plane Ai (FIG. 11);

FIG. 12 is a view looking at the pressure side of the aerofoil and showing the profile XP2 of the pressure side structure in the second pressure side plane P2;

FIG. 13 is a view looking at the pressure side of the aerofoil and showing the profile XP3 of the pressure side structure in the third pressure side plane P3;

FIG. 14 is a view looking at the suction side of the aerofoil and showing the profile XS2 of the suction side structure in the second suction side plane S2;

FIG. 15 is a view looking at the suction side of the aerofoil and showing the profile XS3 of the suction side structure in the third suction side plane S3;

FIG. 16 is a view looking at the pressure side of the aerofoil and showing the superposed profiles XP2 and XP3;

FIG. 17 is a view looking at the suction side of the aerofoil and showing the superposed profiles XS2 and XS3;

FIG. 18 is a view looking at the pressure side of the aerofoil and showing the superposed profiles XP2, XP3, XS2, and XS3, and the relative twist angle $\alpha T$;

Figure 2:
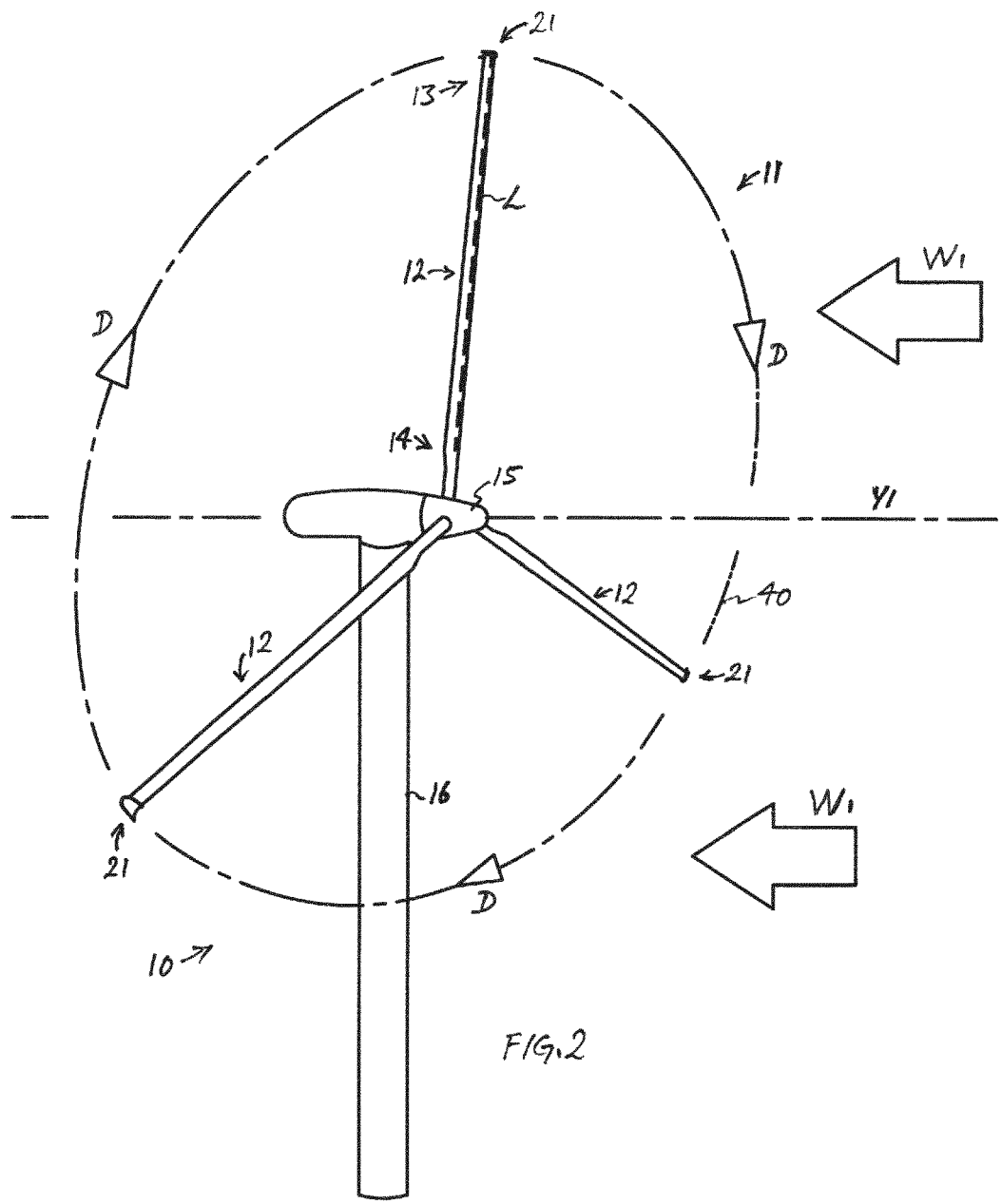
FIG. 2 shows a HAWT with three aerofoil blades, each blade having a tip structure according to an embodiment of the invention.
Figure 1A:
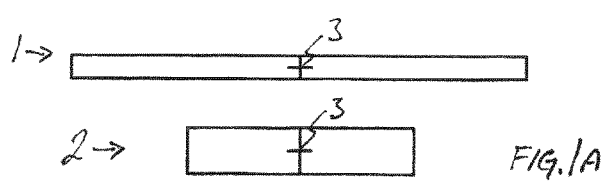
FIG. 1A shows two bodies of equal mass and different slenderness.
Figure 1B:
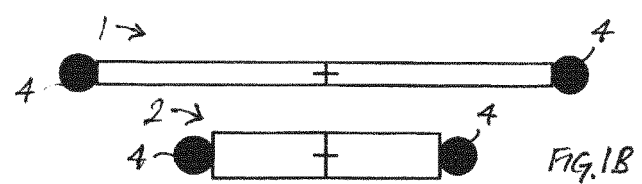
FIG. 1B shows an equal mass added to the distal ends of each of the two bodies of FIG. 1A.

FIG. 20 presents a further CFD simulation data set showing how the power output of the test turbine fitted with the test tip structure varies with the twist angle $\alpha T$;

FIG. 21 presents two further CFD simulation data sets showing how the power output of the test turbine fitted with the test tip structure varies with the combined projected area Pa+Sa of the pressure and suction side structures, respectively for the test tip structure with a twist angle $\alpha T$ of 6°, and for the test tip structure when modified to have a twist angle $\alpha T$ of 0°; and FIGS. 22-25 are inner side views of four further tip structures in accordance with yet further embodiments of the invention.

Reference numerals and characters appearing in more than one of the figures indicate the same or corresponding features in each of them.

Generally in this specification the terms "suction side" and "pressure side" are used to indicate on which side of the aerofoil 12 the respective feature is located.

Referring to FIGS. 2 and 3, a conventional HAWT 10 comprises a rotor 11 having three blades 12 mounted on a hub 15 for rotation in a direction of motion D about an axis of rotation Y1. Each blade is configured as an aerofoil 12, for which reason the blade 12 will referred to hereinafter also as the aerofoil 12, noting that the term "aerofoil" is also used as the context requires to refer to the profile of the respective pressure side or suction side structures. Each blade or aerofoil 12 has a distal or free end region 13 and a proximal or supported end region 14 at the blade root where it connects to the hub 15. The hub 15 is rotatably mounted to yaw about the upper end of a supporting tower 16 to keep the rotor 11 pointing into the direction of the wind W1.

Each blade or aerofoil 12 extends along a length axis L from its free end region 13 to the opposite, supported end region 14.

Referring also to FIG. 10, the aerofoil 12 is mounted in use at the supported end region 14 for motion in the direction of motion D in an airflow W2 relative to the aerofoil. The relative airflow W2 at the free end region 13 is opposed to the direction of motion D, which is to say, the relative airflow W2 is more against the direction of motion than with the direction of motion.

In the example illustrated, the relative airflow W2 is generated by rotation of the aerofoil 12 about the axis of rotation Y1. In that case, the direction of motion D is defined as a tangent of a swept circle 40 at the tip structure 20, 21. The swept circle 40 is defined by rotation of the tip structure 20, 21 about the axis of rotation Y1, as shown in FIG. 2.

It will be understood that the direction of the relative airflow W2, also referred to as the relative wind, is a consequence both of the direction of the wind W1 which impinges on the turbine rotor which extracts a part of its energy as shaft power, and also of the rotation of the blades 12, the vector sum being expressed as the angle of attack which depends on the pitch angle of the chord of the aerofoil 12 as well as the tip speed ratio. In this specification the "pitch angle" means the angle between the chord and the direction of motion D, often referred to in the field of wind turbine design as the "twist angle". Thus it should be understood that in this specification, the relative airflow W2 is generated by rotation of the aerofoil 12 in the sense that the direction of the relative airflow W2 is affected by the rotation of the aerofoil 12.

The conventional HAWT is modified by a tip structure 21 which is mounted in a use position at the free end region of each aerofoil 12 as shown in FIGS. 2 and 3.

FIG. 5 shows a first tip structure 20 which is generally similar to the tip structure 21 and may be mounted in the same position at the free end region of the aerofoil 12. For ease of reference, the features of the first tip structure 20 will be discussed below with reference to its mounted position on a turbine as illustrated by the similar tip structure 21 of FIGS. 2-4.

The tip structure 20, 21 may be formed integrally with the aerofoil 12 or, as shown in FIG. 5, may be configured as a retrofit unit to include at least one attachment portion 30 which is attachable to the free end region 13 of the aerofoil 12 to form an assembly. The attachment portion 30 may comprise a socket 31 which receives a cut end portion 17 of the blade 12; the outer surface of the attachment portion is contoured to form a smooth extension of the profile of the aerofoil 12. The parts may be connected in any convenient way, for example, bonded together by adhesive. Typically the outer few hundred millimetres of a wind turbine blade are very dense because adhesive is forced into the blade tip during manufacture, providing a solid base for attachment of the tip structure.

Figure 8:
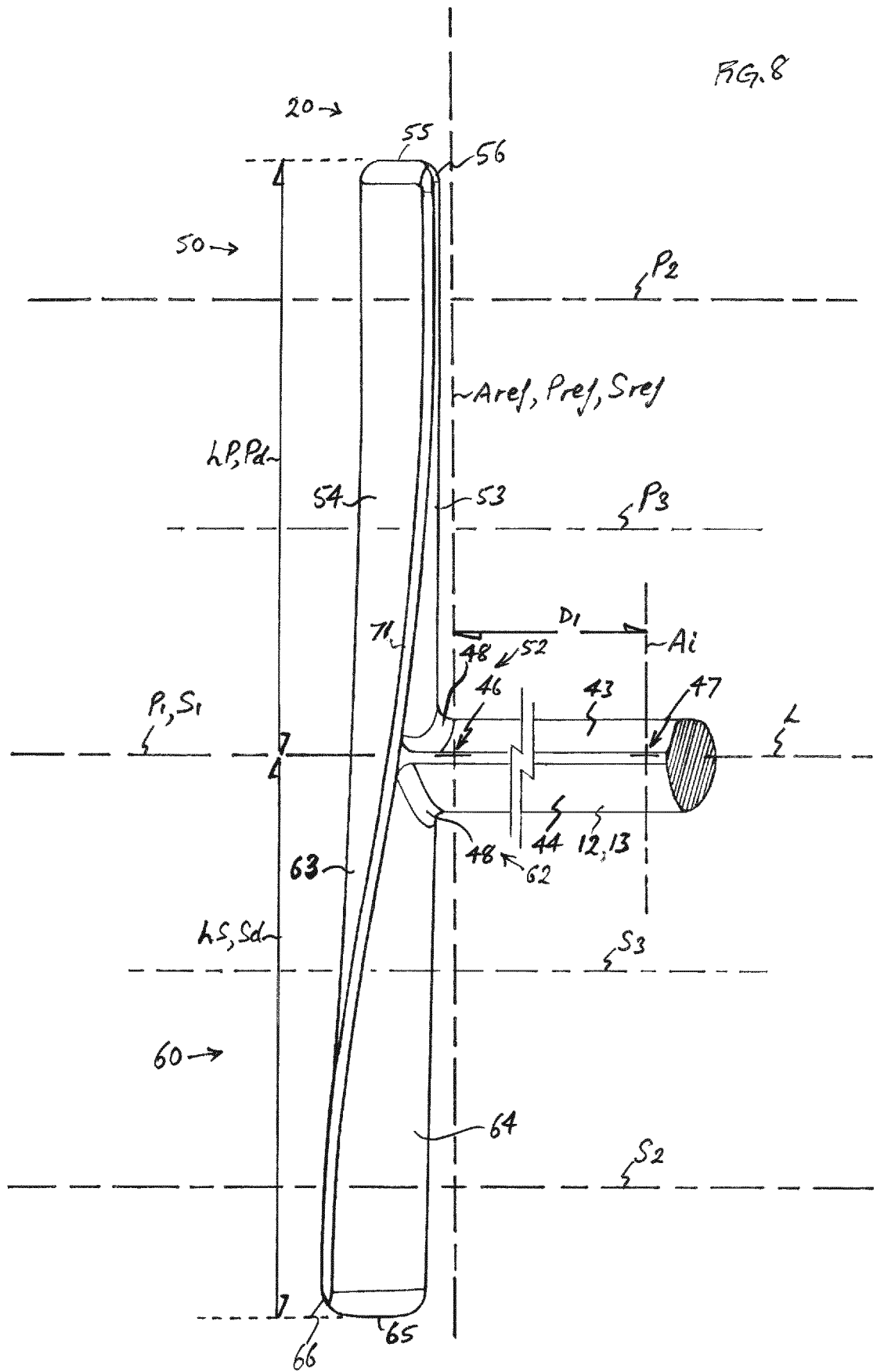

Referring to FIG. 8, a section plane Aref, Ai is defined as normal (i.e. perpendicular) to the length axis L. As best seen in FIGS. 10 and 11, when considered in section in the section plane Aref, Ai normal to the length axis L, the aerofoil 12 defines a profile having a maximum length dimension defined by a chord Cref, Ci.

The chord is a straight line having a length between a leading edge point 41 on the profile and a trailing edge point 42 on the profile. The length of the chord defines the maximum length dimension of the profile defining the chord. In FIG. 11 the length of the chord Ci in section plane Ai is indicated as C1.

The profile of the aerofoil extends between the leading edge point 41 and the trailing edge point 42 on a first, pressure side 43 of the aerofoil and a second, suction side 44 of the aerofoil. The profile is configured to generate a reduced pressure on the suction side 44 relative to the pressure side 43 when the aerofoil is arranged in use in the airflow W2 with the leading edge point 41 upstream of the trailing edge point 42, as shown.

The illustrated embodiments show an asymmetric or cambered aerofoil 12. In the case of an asymmetric or cambered aerofoil, the leading edge point 41 and trailing edge point 42 are defined by the opposite ends of the camber line or mean centre line 45 of the profile as shown in FIGS. 10 and 11. However, the or each aerofoil (whether forming the blade or the pressure or suction side structure) may have any suitable profile. If an aerofoil is symmetric about the chord, the different effects of the suction side 44 and pressure side 43 will be determined by the angle of attack between the chord and the relative wind W2, while for an asymmetric aerofoil their different effects will be determined both by the angle of attack and by their different shapes.

The tip structure 20, 21 comprises a pressure side structure 50 which extends from the pressure side 43 of the aerofoil 12, and a suction side structure 60 which extends from the suction side 44 of the aerofoil 12.

The length axis L of the aerofoil 12 is defined as a line extending through an axis point 46, 47 on the chord in every position of the section plane (Aref, Ai) from the free end region 13 to the supported end region 14 of the aerofoil 12. Each axis point 46, 47 is located at 25% of the length of the chord from the leading edge point 41.

The axis point 46 is referred to hereinafter as the terminal axis point, which is defined as that axis point furthest from the supported end region 14, thus defining a distal end of the aerofoil. The distal end may be identified at the last point along the length axis L where the profile contained in the section plane still defines an aerofoil; it may be in a section plane passing through the fillet 48 (FIG. 8, FIG. 9) or, as shown, through the position where the fillet 48 begins to depart from the profile of the aerofoil 12.

Referring to FIGS. 8 and 10, the first reference plane Aref is defined as a section plane which may be selected at any convenient position at the free end region 13 of the aerofoil 12 close to the tip structure. In the illustrated example, the first reference plane Aref is selected to be the section plane containing the terminal axis point 46. The chord Cref of the aerofoil 12 lying in the first reference plane Aref is defined as the reference chord.

The axis point 47 is defined on the length axis (L) at a straight line distance D1 (FIG. 8) from the terminal axis point 46 and is referred to hereinafter as the intermediate axis point, with the section plane Ai being referred to as the intermediate section plane, as further discussed below.

The length axis L may be straight as illustrated, or alternatively may be curved, for example, where the free end region 13 of the blade 12 is swept so that it curves away from the supporting structure 15, 16 towards its tip, in which case the length axis L will follow the curve.

A first pressure side plane P1 containing the reference chord Cref is defined at an angle βP from 75° to 90° relative to the first reference plane Aref, and a first suction side plane S1 containing the reference chord Cref is defined at an angle βS from 75° to 90° relative to the first reference plane Aref. Preferably the first pressure side plane P1 and first suction side plane S1 are selected to be as near as possible normal to a mean central plane, respectively of the pressure side structure 50 and suction side structure 60, as illustrated in FIGS. 8 and 9.

In the examples illustrated in FIGS. 2-8 and 10-18 the pressure side and suction side structures 50, 60 are oriented generally normal (perpendicular) to the blade 12, and the first pressure side and first suction side planes P1, S1 are defined generally in parallel with the tip structure so that the angle βP=βS=90°. Thus, P1 and S1 lie in a common plane.

Figure 9:
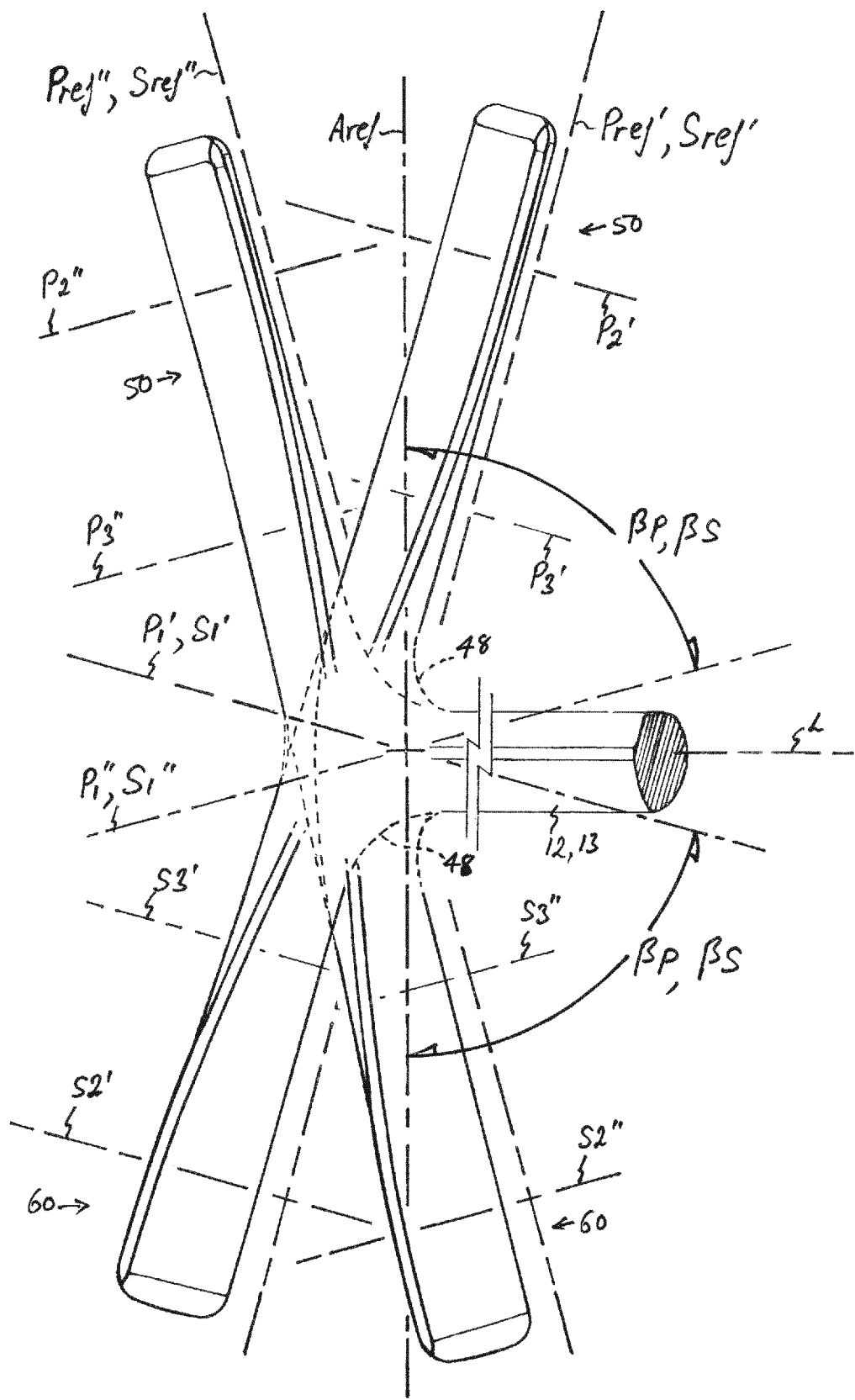

FIG. 9 illustrates how either or both of the pressure side and suction side structures 50, 60 may alternatively be canted relative to the blade 12 at a cant angle of about 75° to 90° to the free end region 13 of the blade when considered in the direction of the view of FIG. 9, in which case the angle 13P, 3S can be selected to position the respective planes P1, S1 accordingly. At the minimum angle 13P, 3S of 75° the respective first pressure side plane P1 and/or first suction side plane S1 will assume positions P1', S1' or P1", S1" depending on the direction of the cant.

An angle βP, βS of less than 90° may be necessary for example where the tip structure is mounted on a rotor blade with a swept tip (i.e. a locally angled free end region 13), hence a curved length axis L, and the reference plane Aref is defined through the swept free end region 13 of the blade while the tip structure is arranged to be more nearly normal to the length axis of the longer, straight region of the blade which extends to its supported end region 14. This was the case for the geometry of the test tip structure when fitted to the test turbine, as further discussed below.

Referring again to FIGS. 8 and 9, a pressure side reference plane Pref containing the reference chord Cref is defined as normal to the first pressure side plane P1. Thus it will be understood that the reference chord Cref defines the intersection of Pref and P1.

A suction side reference plane Sref containing the reference chord Cref is defined as normal to the first suction side plane S1. Thus it will be understood that the reference chord Cref also defines the intersection of Sref and S1.

A second pressure side plane P2 is defined in parallel with the first pressure side plane P1 to pass through the pressure side structure 50. The second pressure side plane P2 may be defined at any suitable position over the height hP of the pressure side structure 50. The pressure side pitch angle αP, which is the angle between the chord of the pressure side structure 50 and the direction of motion D, is defined by reference to the chord CP2 of the pressure side structure 50 in the second pressure side plane P2.

In order to quantify the extent to which the pressure side pitch angle αP varies (if at all) with the height hP of the pressure side structure 50, a third pressure side plane P3 is defined in parallel with and between the first and second pressure side planes P1, P2. The chord of the pressure side structure 50 in the third pressure side plane P3 is designated as CP3.

A second suction side plane S2 is defined in parallel with the first suction side plane S1 to pass through the suction side structure 60. The second suction side plane S2 may be defined at any suitable position over the height hS of the suction side structure 60. The suction side pitch angle αS, which is the angle between the chord of the suction side structure 60 and the direction of motion D, is defined by reference to the chord CS2 of the suction side structure 60 in the second suction side plane S2.

In order to quantify the extent to which the suction side pitch angle αS varies (if at all) with the height hS of the suction side structure 60, a third suction side plane 53 is defined in parallel with and between the first and second suction side planes S1, S2. The chord of the suction side structure 60 in the third suction side plane S3 is designated as CS3.

In the standard case as illustrated in FIG. 8, since P1 and S1 lie in a common plane and normal to Aref, it can be seen that Pref and Sref are parallel (or coplanar) with Aref.

If alternatively one or both of the pressure and suction side structures is/are canted as shown in FIG. 9, the respective planes are all canted accordingly so that in a first direction of cant, Pref, P1, P2, P3 and/or Sref, S1, S2, S3 become Pref', P1', P2', P3', Sref', Sr, S2', S3' respectively; and in a second, opposite direction of cant, Pref, P1, P2, P3 and/or Sref, S1, S2, S3 become Pref", P1", P2", P3", Sref", S1", S2", S3" respectively.

Figure 12:
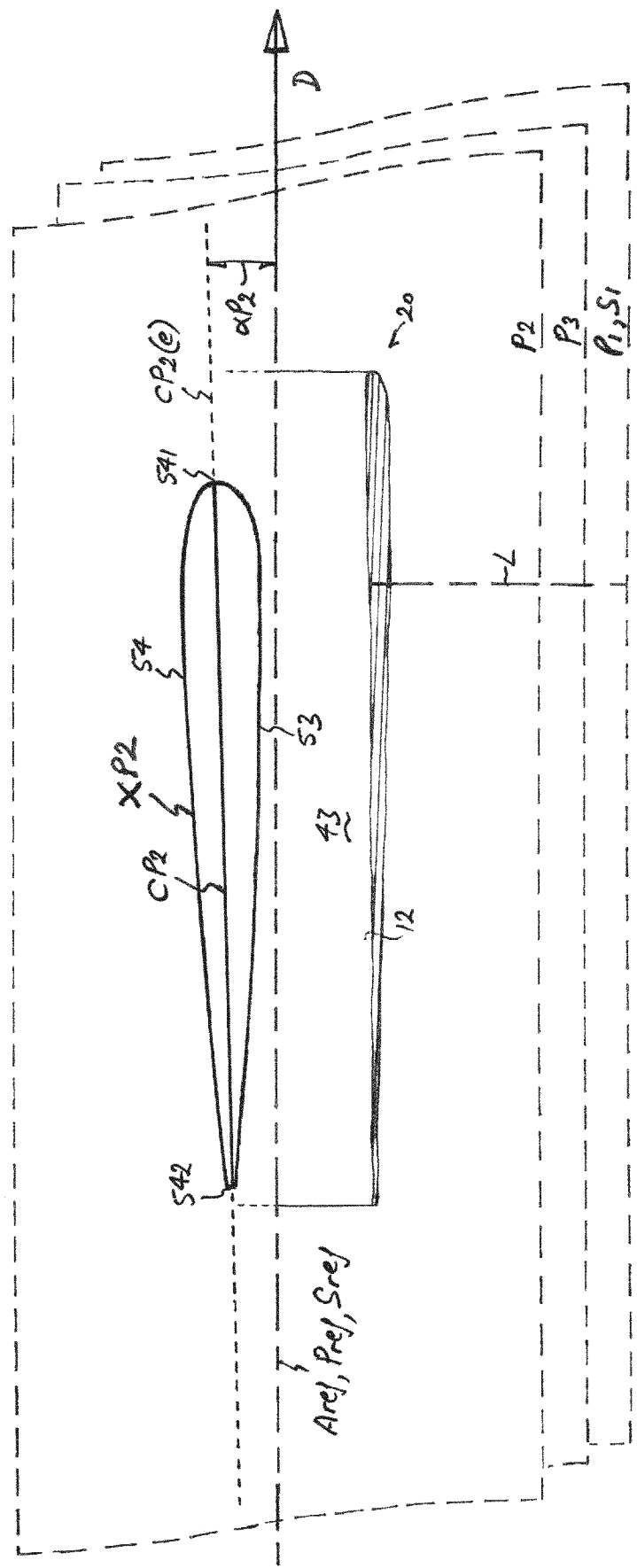
Figure 13:
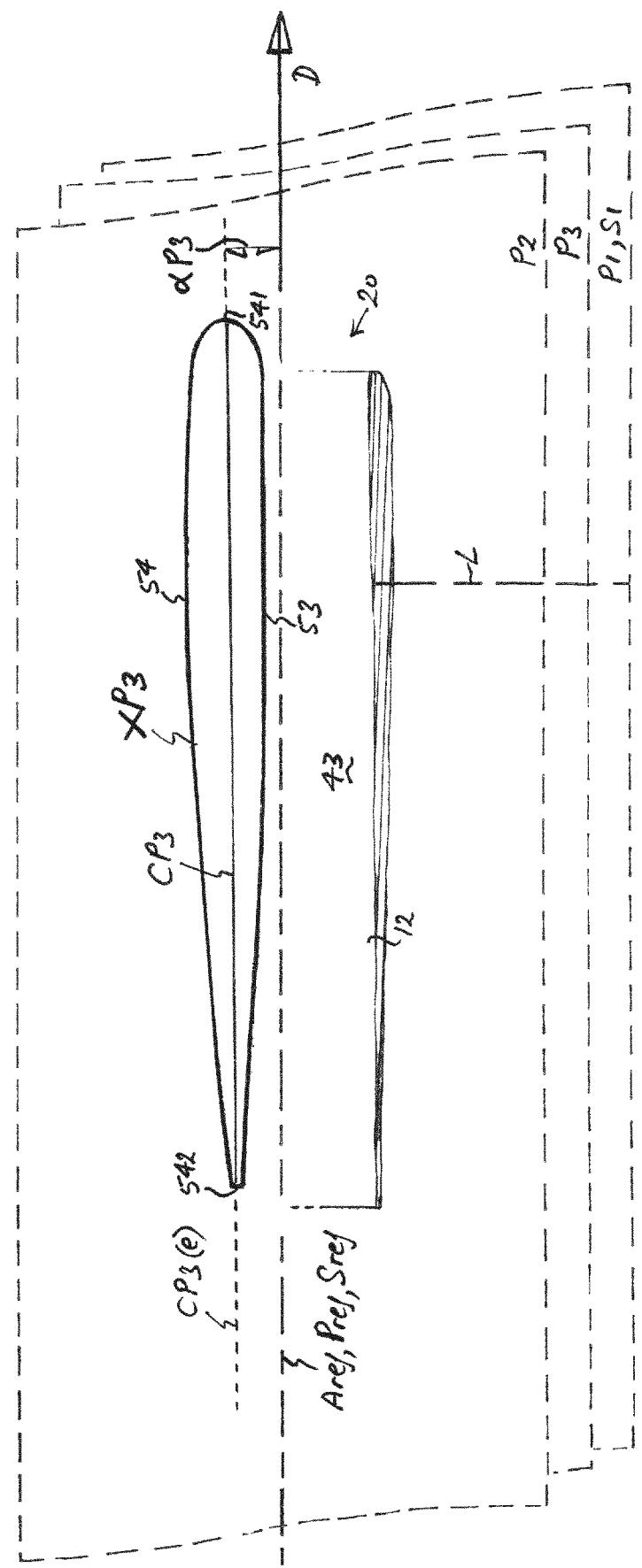

FIGS. 12 and 13 show the profile of the pressure side structure 50 when considered in section, respectively as profile XP2 in the second pressure side plane P2 and as profile XP3 in the third pressure side plane P3. Each profile XP2, XP3 has a respective chord CP2, CP3 which defines its maximum length dimension.

Figure 14:
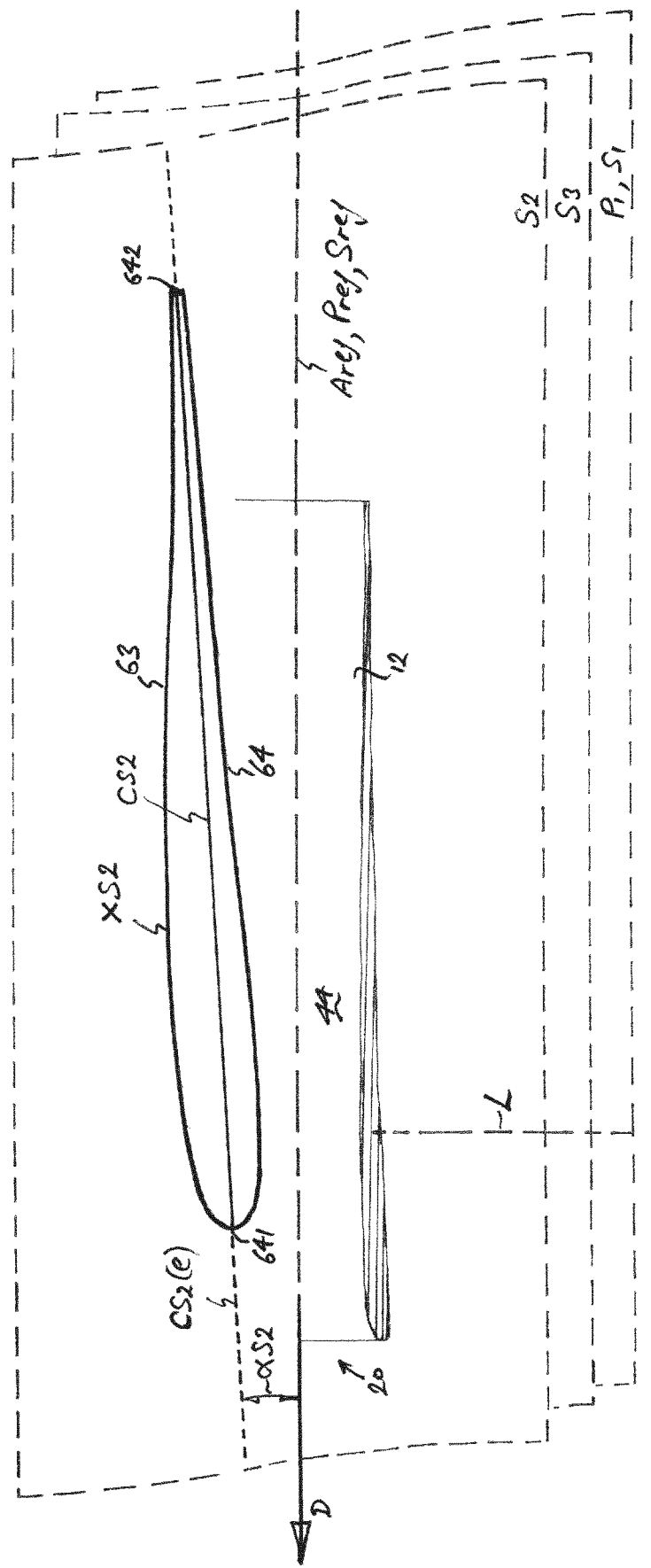
Figure 15:
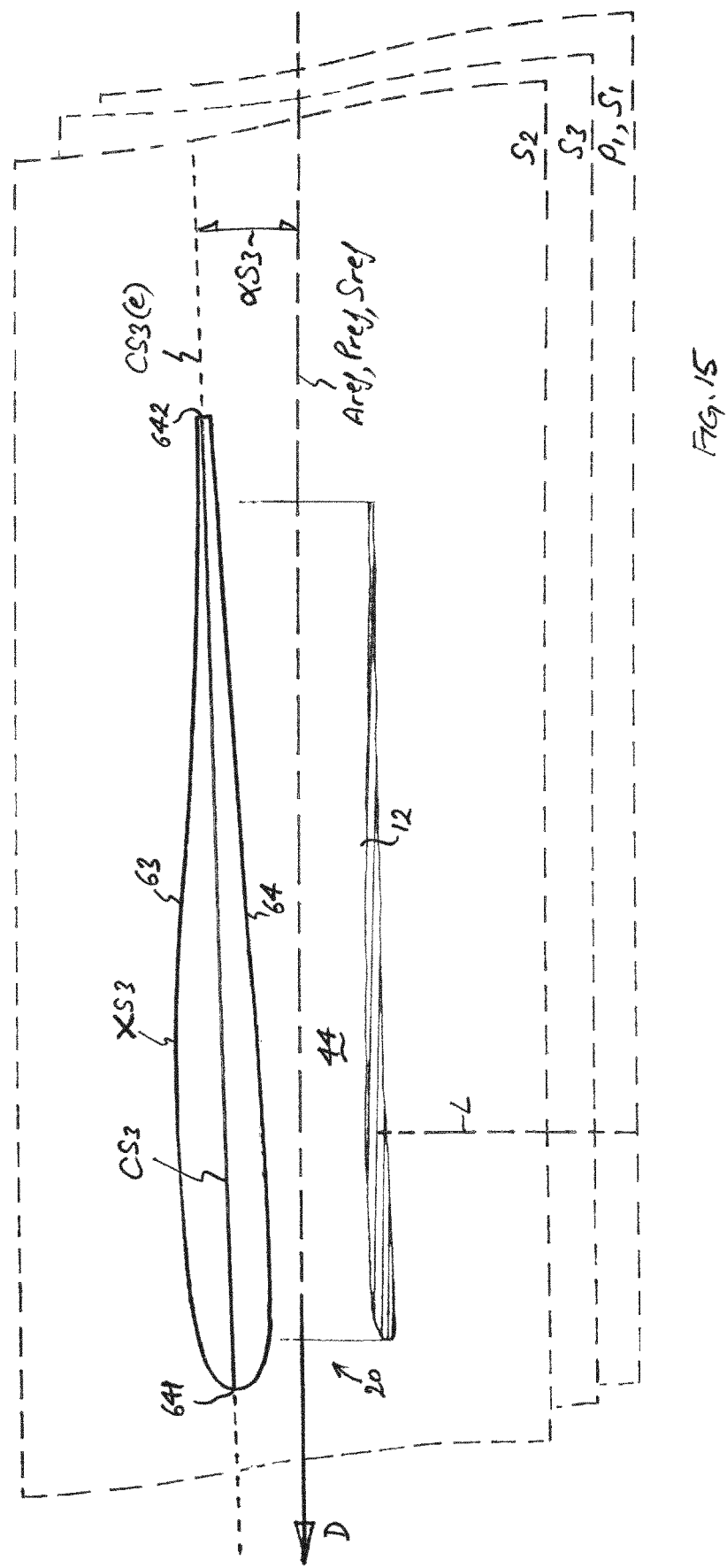
Figure 16:
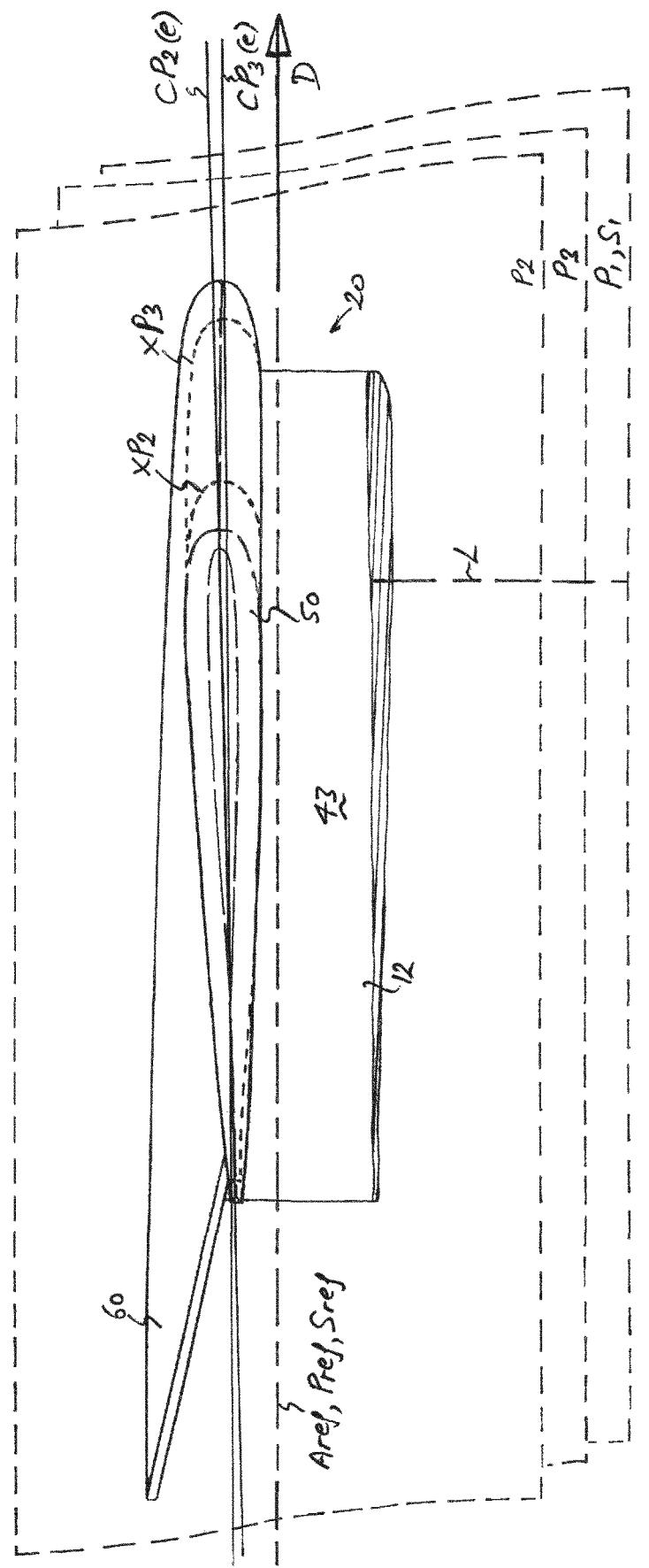
Figure 17:
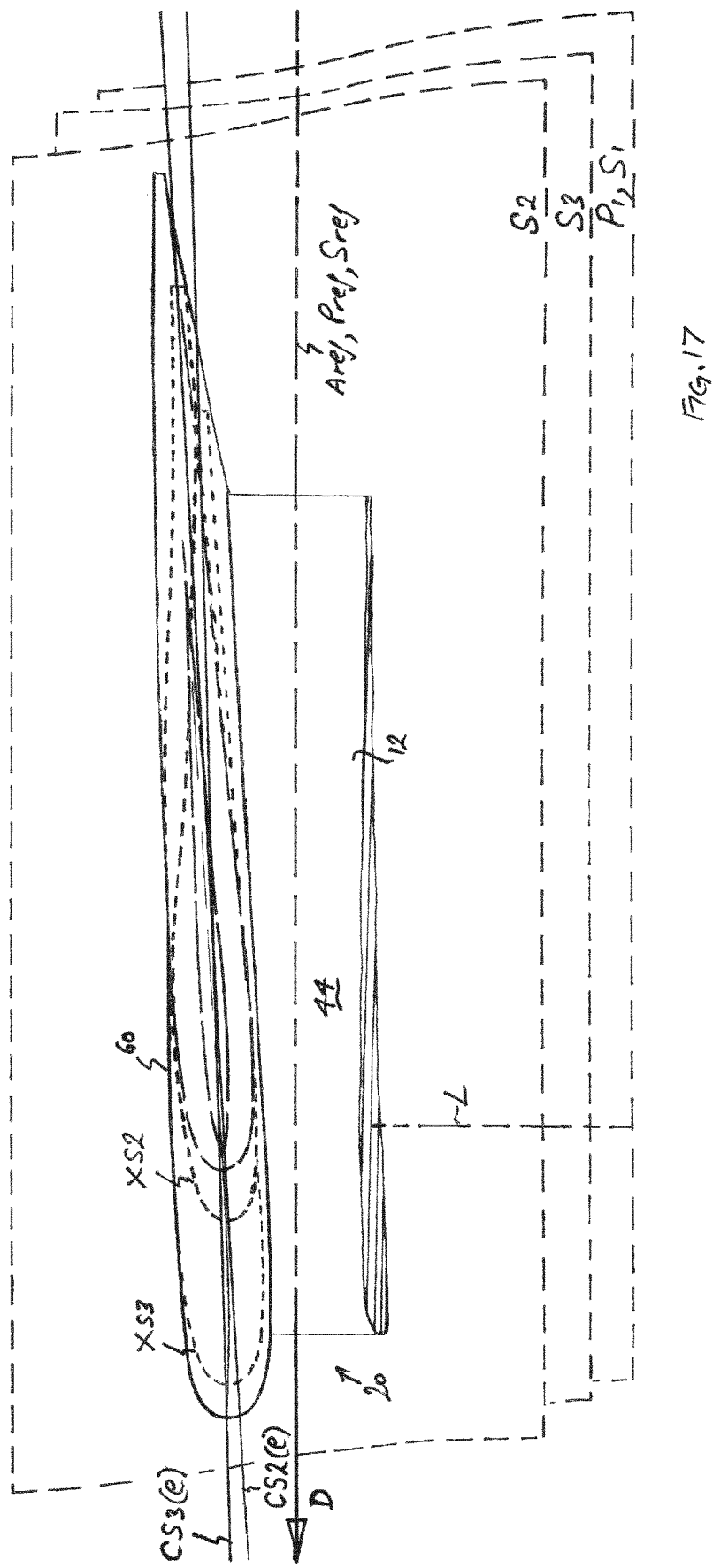

Similarly, FIGS. 14 and 15 show the profile of the suction side structure 60 when considered in section, respectively as profile XS2 in the second suction side plane S2 and as profile XS3 in the third suction side plane 53. Each profile XS2, XS3 has a respective chord CS2, CS3 which defines its maximum length dimension.

Thus, the chord of the pressure side structure 50 is shown in the second and third pressure side planes P2, P3 respectively as chord CP2, CP3, while the chord of the suction side structure 60 is shown in the second and third suction side planes S2, S3 respectively as chord CS2, CS3.

For ease of reference in FIGS. 12-18, the chord CP2, CP3, CS2, CS3 is extended beyond the profile of the respective pressure or suction side structure as reference line CP2(*e*), CP3(*e*), C52(*e*), and CS3(*e*) respectively.

In each case the chord is a straight line between a leading edge point 541, 641 on the profile and a trailing edge point 542, 642 on the profile, the leading edge point being upstream of the trailing edge point with respect to the airflow W2 when considered in the use position of the tip structure 20, 21 as shown for example in FIG. 2.

It will be understood of course that the section of the profile is the section of the outer surface contour of the respective pressure side or suction side structure in the respective plane; the internal structure is not shown, and may be solid or, more typically, hollow, depending on the method of fabrication (which may be for example in glass reinforced plastics, carbon fibre, or any other suitable materials) as well known in the art of aerofoil construction.

Preferably, in order to optimise the glide ratio, each of the pressure side structure 50 and the suction side structure 60 is configured as a respective aerofoil having a pressure side 53, 63 and a suction side 54, 64. The aerofoil is configured to generate a reduced pressure on the suction side 54, 64 relative to the pressure side 53, 63 when the tip structure is arranged in use in the airflow W2. When considered with respect to a direction of the length axis L, the pressure side 53 of the aerofoil of the pressure side structure 50 and the suction side 64 of the aerofoil of the suction side structure 60 may be arranged as shown to face generally towards the supported end region 14, while the suction side 54 of the aerofoil of the pressure side structure 50 and the pressure side 63 of the aerofoil of the suction side structure 60 are arranged to face generally away from the supported end region 14.

Although the tip structure 20, 21 is illustrated in an orientation which is generally normal (i.e. perpendicular) to the blade or aerofoil 12, as best seen in FIG. 8, it may alternatively be canted relative to the blade. Thus, references to facing generally towards (or away from) the supported end region 14 when considered with respect to a direction of the length axis L should be construed to mean facing in a direction which is generally more towards than away from (or more away from than towards) the supported end region 14.

The aerofoil in each respective pressure side plane or suction side plane need not have the shape illustrated, but may have any desired profile in accordance with well known aerofoil design principles to optimise the glide ratio and overall operating conditions when the tip structure is mounted in its intended use position. Irrespective of whether the pressure side and suction side structures are configured as aerofoils or as flat plates, the leading edge point and trailing edge point will be identified by the mean centre line of the profile as described above, with the chord defined as a straight line between those two points.

The direction of motion D is represented by a straight line (with the motion in the direction of the arrow as shown) in each of the second and third pressure side planes P2, P3 and the second and third suction side planes S2, S3.

It can be seen that when considered in the respective pressure side plane or suction side plane, the chord of the pressure side structure extends at an pressure side pitch angle $\alpha P$ relative to the direction of motion D, while the chord of the suction side structure extends at a suction side pitch angle $\alpha S$ relative to the direction of motion D.

It will be understood that the first, second and third pressure side planes and suction side planes may be angled somewhat obliquely relative to the true direction of motion D. For a rotating tip structure the direction of motion D will lie in the plane of rotation, i.e. a plane normal to the axis of rotation Y1 and containing the swept circle 40, the obliquity reflecting the pitch angle of the blade 12 at the tip structure which may be taken to be the angle of the reference chord Cref relative to the plane of rotation. In this case the direction of motion D may be represented by a straight line in each of the first, second and third pressure side planes and suction side planes, with the straight line in each case being the closest fit to the direction of motion in the respective plane. If the aerofoil 12 is a rotor blade, the direction of motion D might be considered as a straight line in the plane of rotation which is projected along the direction of the rotation axis Y1 onto the respective first, second or third pressure or suction side plane. If the aerofoil 12 is for example the wing of an aircraft, the direction of motion D may be considered as the direction in which a point is translated by the forward motion of the aircraft in straight and level flight. In each case, the angle $\alpha P$ or $\alpha S$ is defined relative to the straight line representing the direction of motion D in the respective pressure side plane or suction side plane.

The pressure side pitch angle $\alpha P$ can be seen in the second and third pressure side planes P2, P3 respectively as pressure side pitch angles $\alpha P2$ and $\alpha P3$, as shown in FIGS. 12 and 13.

The suction side pitch angle $\alpha S$ can be seen in the second and third suction side planes S2, S3 respectively as suction side pitch angles $\alpha S2$ and $\alpha S3$, as shown in FIGS. 14 and 15.

Figure 18:
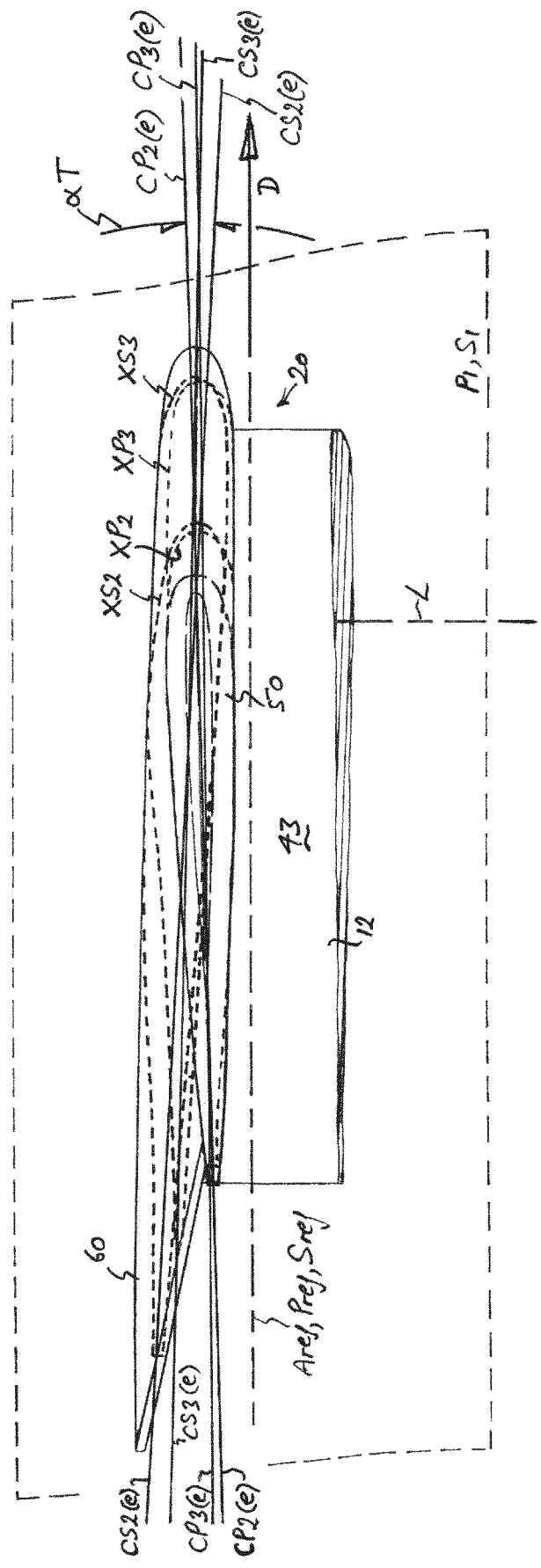

The difference between the respective pressure side and suction side pitch angles represents the relative twist angle $\alpha T$ between the respective profiles of the pressure side and suction side structures, as shown in FIG. 18.

Optionally, as exemplified by the illustrated embodiment and best seen in FIG. 8, each of the pressure side and suction side structures may be smoothly and continuously curved with respect to the direction of motion D for part, most or (as illustrated) all of its height hP, hS from its root 52, 62 at the respective, pressure side 43 or suction side 44 of the aerofoil 12 to its respective tip 55, 65. Thus, each of the pressure side pitch angle $\alpha P$ and the suction side pitch angle $\alpha S$, hence also the twist angle $\alpha T$ may increase smoothly and progressively with the height hP, hS of the respective pressure side or suction side structure from the respective first pressure side or suction side plane P1, S1.

Alternatively, either or both of the pressure side pitch angle $\alpha P$ and the suction side pitch angle $\alpha S$ may decrease smoothly and progressively with the height hP, hS of the respective pressure side or suction side structure; this can be arranged for example to reduce loading towards the respective extremity of the tip structure so as not to exceed the rated capacity of the turbine in its intended use situation.

In alternative embodiments the chord of the pressure side and/or suction side structure might lie in a flat plane for part or all of its height hP, hS so that the respective pressure side or suction side pitch angle $\alpha P$, $\alpha S$ does not vary with height hP, hS in that region. In further alternative embodiments the twist of the pressure side and/or suction side structure may vary (increase or decrease) step-wise with height hP, hS. That is to say, the pressure side or suction side structure might be twisted in a local region (which is to say, the pitch angle $\alpha P$, $\alpha S$ may vary rapidly with height hP, hS in that region) which marks a transition between two relatively less twisted regions (i.e. where the pitch angle $\alpha P$, $\alpha S$ is constant or more constant with height hP, hS), the two regions having different pressure side or suction side pitch angle $\alpha P$, $\alpha S$.

In each case, and as exemplified by the illustrated embodiment, the angle $\alpha P$ is less positive or more negative than the angle $\alpha S$.

That is to say, with respect to the length axis L of the aerofoil, the chord CP2 extends forwardly in the direction of motion D and relatively more radially outwardly away from the supported end region, or less radially inwardly towards the supported end region, than the chord CS2. A relative twist angle $\alpha T$ greater than zero degrees is thus defined between the chords CP2, CS2 of the pressure and suction side structures.

In this specification, the angle $\alpha P$ or $\alpha S$ is defined as positive where the respective chord CP2, CP3, CS2, CS3 extends forwardly (i.e. in the direction of the arrow) and towards the supported end region with respect to the direction of motion D, and as negative where the respective chord CP2, CP3, CS2, CS3 extends forwardly (i.e. in the direction of the arrow) and away from the supported end region with respect to the direction of motion D.

The angular relationship between the pressure and suction side structures 50, 60 defined by the relative twist angle αT generates an enhanced pressure differential across the respective wetted surfaces of the pressure and suction side structures which in tests is found to result in unexpectedly good performance, as further discussed below. Inter alia, the effective lateral diffusion and compression (perpendicular to the length axis L) generated by the angular arrangement of the respective wetted surfaces of the tip structure may be expected to reduce the radially outward (rolling) flow from the pressure side 43 to the suction side 44 of the blade 12, reducing the formation of a vortex at the tip and so reducing drag, as well as controlling aerodynamic losses by enhancing the pressure differential between the respective pressure and suction sides of the blade.

As exemplified by the illustrated embodiment, the tip structure may be arranged so that the angle αS is positive and the angle αP is negative, and the angle αS is greater than the angle αP. This arrangement is found to provide good performance when the tip structure is attached to the blade of a rotor, particularly a HAWT.

FIG. 20 (further discussed below) shows that for the test tip structure when optimised for the test turbine, a twist angle of about 3° or more may deliver around 60% of the peak improvement in power output, hence most of the net benefit of the tip structure. As a rule of thumb therefore, when applied to the novel tip structure, for example, as optimised for any typical commercial HAWT, it is believed that good to optimal performance may be achieved when the angle αP is at least 3° less positive or more negative than the angle αS.

For many aerofoils including those typically employed for a rotor blade, such as the rotor blade of a HAWT, good performance may be achieved where the angle αP is from 2° positive to 5° negative, and the angle αS is from 2° positive to 9° positive.

The pressure side structure 50 may be twisted in its height dimension so that the angle $αP_3$ is more positive or less negative, or more negative or less positive, than the angle $αP_2$. Alternatively or additionally, the suction side structure may be twisted in its height dimension so that the angle $αS_3$ is less positive or more negative, or less negative or more positive, than the angle $αS_2$, as illustrated.

In each case, the progressive or step-wise twist makes it possible to minimise drag at the fillet 48 at the root of the pressure side or suction side structure, and/or at the respective, upper or lower extremity or tip of the pressure side or suction side structure, by progressively increasing the pressure differential with respect to the height dimension of the blade.

Projected Surface Area

Figure 7:
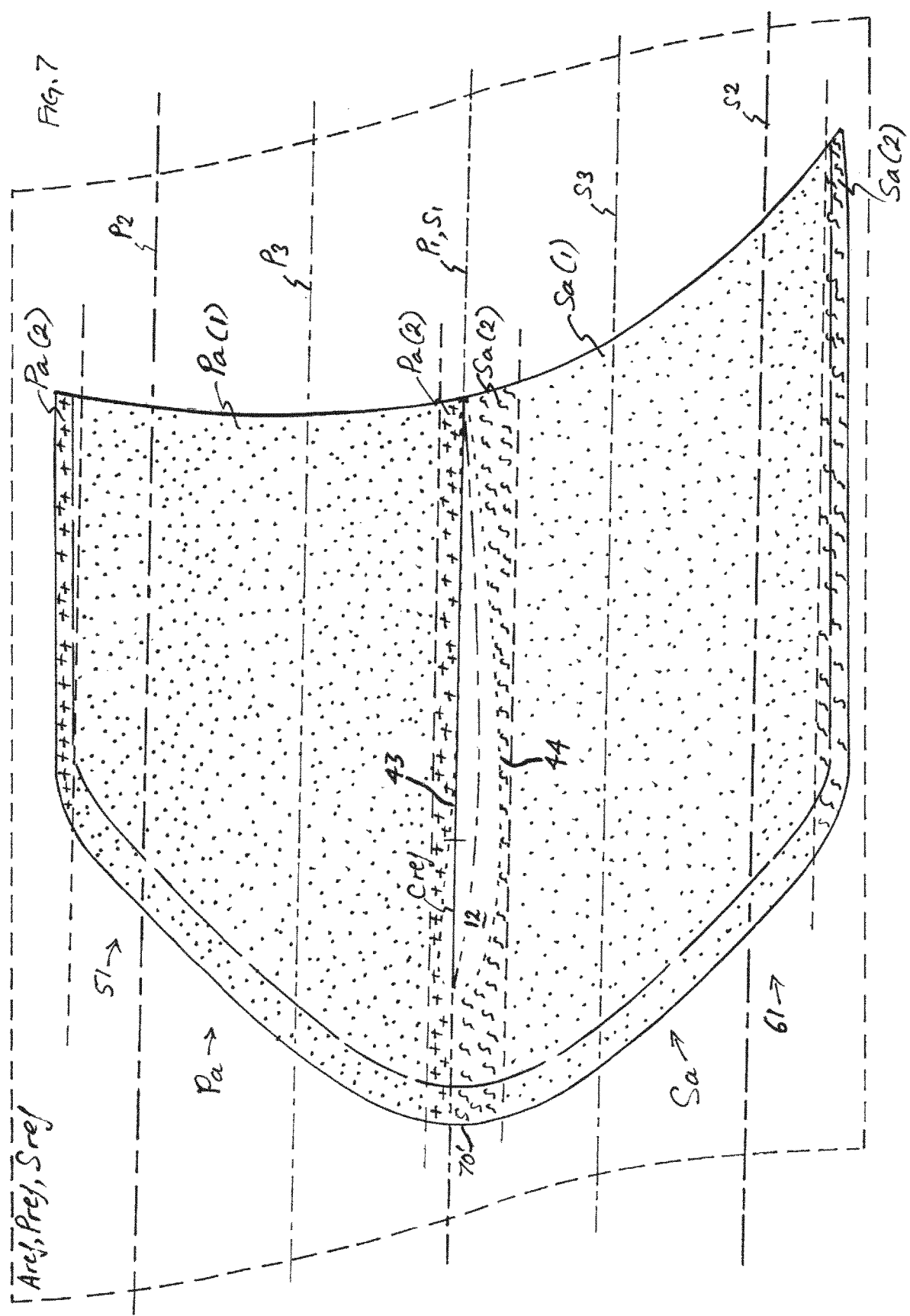

As shown in FIG. 7, the pressure side structure 50 may be projected in a direction normal to the pressure side reference plane Pref to define a projected profile 51 in the pressure side reference plane Pref.

The suction side structure 60 is projected in a direction normal to the suction side reference plane Sref to define a projected profile 61 in the suction side reference plane Sref.

Figure 6:
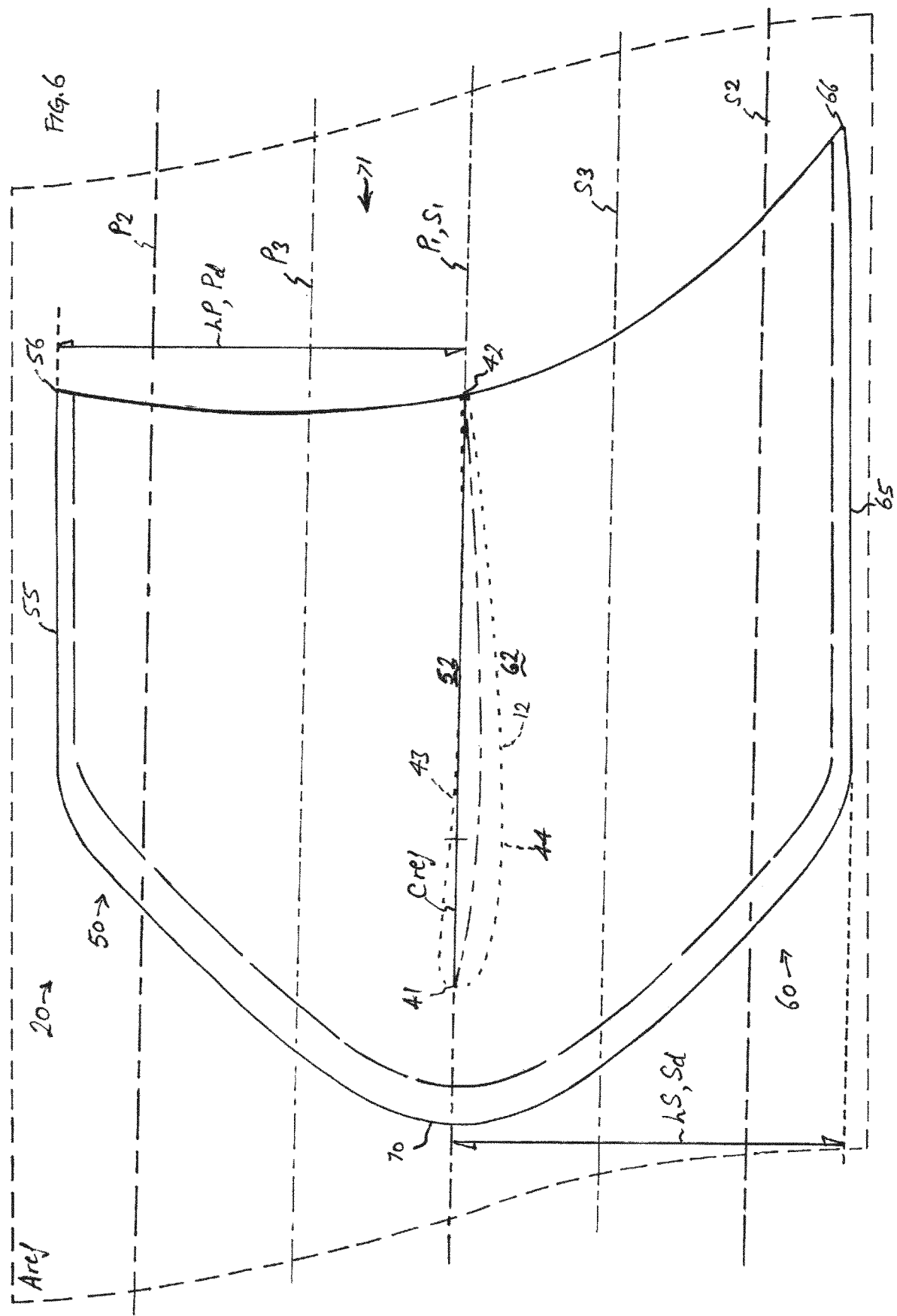

For ease of reference, since the projected profile of the tip structure 20 including projected profiles 51, 61 as shown in FIG. 7 are the same shape and size as the profile of the tip structure 20 and its respective pressure side and suction side structures 50, 60 as shown in FIG. 6, the features of the projected profiles as discussed below (including in particular distances Pd, Sd) are illustrated in either or both of FIGS. 6 and 7, which are referred to interchangeably for this purpose, and also in FIG. 22.

Referring to FIG. 7, the projected profile 51 of the pressure side structure 50 defines a total area Pa on one side of the first pressure side plane P1 and bounded by the pressure side 43 of the aerofoil 12. The total area Pa as shown is the sum of the stippled area Pa (1) and the two areas Pa (2) with different, "+" shaped stippling. The areas Pa (2) contain those parts of the pressure side structure occupied by the fillet 48 at its root 52 and the smooth curvature of its (upper or lower) end surface at its tip 55. The stippled region Pa (1) represents at least about 90% of the total projected surface area Pa.

The projected profile 61 of the suction side structure 60 defines a total area Sa on one side of the first suction side plane S1 and bounded by the suction side 44 of the aerofoil. The total area Sa as shown is the sum of the stippled area Sa (1) and the two areas Sa (2) with different, "s" shaped stippling. The areas Sa (2) contain those parts of the suction side structure occupied by the fillet 48 at its root 62 and the smooth curvature of its (upper or lower) end surface at its tip 65. The stippled region Sa (1) represents at least about 85% of the total projected surface area Sa.

In order to maximise the additional power generated by the pressure side structure 50 over at least most of its surface area, the angle αP, taken as the angle αP2, may be negative when the second pressure side plane P2 is defined in a position to intersect the pressure side reference plane Pref anywhere in a region comprising at least 50% of the area Pa.

In the example shown, this condition is satisfied where the pressure side reference plane Pref lies anywhere in the stippled region Pa (1).

Similarly, in order to maximise the additional power generated by the suction side structure 60 over at least most of its surface area, the angle αS, taken as the angle αS2, may be positive when the second suction side plane S2 is defined in a position to intersect the suction side reference plane Sref anywhere in a region comprising at least 50% of the area Sa.

In the example shown, this condition is satisfied where the suction side reference plane Sref lies anywhere in the stippled region Sa (1).

A favourable glide ratio may be obtained where the angle αP, taken as the angle αP2, is less positive or more negative than the angle αS, taken as the angle αS2, when the second pressure side plane P2 intersects the pressure side reference plane Pref anywhere in a region comprising at least 50% of the area Pa and the second suction side plane S2 intersects the suction side reference plane Sref anywhere in a region comprising at least 50% of the area Sa.

A favourable glide ratio may also be obtained where the angle αP is from 2° positive to 5° negative and the angle αS is from 2° positive to 9° positive when the second pressure side plane P2 (defining the angle αP as αP2) intersects the pressure side reference plane Pref anywhere in a region comprising at least 50% of the area Pa and the second suction side plane S2 (defining the angle αS as αS2) intersects the suction side reference plane Sref anywhere in a region comprising at least 50% of the area Sa.

For good performance the combined projected section area Pa, Sa of the pressure and suction side structures may be selected to be proportional to the length of the chord of the aerofoil as follows. Referring to FIGS. 7, 8 and 11, the chord Ci passing through the intermediate axis point 47 in the intermediate section plane Ai has a length C1 between the respective leading edge point 41 and trailing edge point 42 of the profile of the aerofoil 12. When the straight line distance D1 (FIG. 8) between the intermediate axis point 47 and the terminal axis point 46 is selected to lie within a range from 300 mm to 700 mm, the relationship between the tip structure projected section area and the chord length of the aerofoil may be selected to satisfy the statement: $(Pa+Sa) \leq (3 \cdot C1)^2$ Referring to FIGS. 6 and 8, it can be seen that the height hP of the projected profile 51 of the pressure side structure 50 extends to a maximum value, indicated as the maximum perpendicular distance Pd from the first pressure side plane P1 to its tip 55, while the height hS of the projected profile 61 of the suction side structure 60 extends to a maximum value, indicated as the maximum perpendicular distance Sd from the first suction side plane S1 to its tip 65.

It is found that good performance can be obtained where Sd>Pd, which is to say, the maximum distance Sd (i.e. maximum height hS) of the suction side structure 60 is greater than the maximum distance Pd (maximum height hP) of the pressure side structure 50, as illustrated by the alternative embodiment of FIG. 22.

The profile of each of the pressure and suction side structure will generally comprise a radiused or conic leading edge and a rearwardly tapering tail region terminating in a point or a flat back as shown. Depending on the profile selected, the ratio of chord length to the maximum width or thickness dimension, i.e. its maximum dimension normal to the chord in the section containing the chord, may be generally less than 10:1 in each of the pressure and suction side structures.

Some or all of the preferred parameter values as discussed herein may be used in any desired combination to suit the individual use situation as guidelines when configuring the tip structure for use on the rotor blade of a HAWT or in other applications.

In practice, the geometry of the novel tip structure 20 incorporating its essential features as described above will be optimised for the aerofoil 12 to which the tip structure is to be attached, following the established principles of aerofoil design. Inter alia, the suction side pitch angle αS and pressure side pitch angle αP determine the loading on the aerofoil sections of the pressure and suction sides 50, 60 of the tip structure 20 and are selected to optimise lift relative to drag.

The pressure side and suction side structures 50, 60 may be configured to define any of a wide variety of different aerofoil profiles as known in the art, including combinations of different profiles over the respective height dimension hP or hS, and the suction side pitch angle αS and pressure side pitch angle αP may be selected within the range of values discussed below to define favourable operating conditions for the selected aerofoil profile or profiles. Those skilled in the art will appreciate for example that the suction side pitch angle αS and pressure side pitch angle αP may be varied inter alia to suit the camber of the aerofoil profile.

Preferably the suction side pitch angle αS and pressure side pitch angle αP are selected to obtain an angle of attack which optimises loading of the adjacent surfaces of the blade 12 relative to the drag from the tip structure, corresponding to the peak of the performance curve in FIG. 20 (Power v. Twist) as further discussed below. Following this basic principle, those skilled in the art will recognise that the optimal suction side pitch angle αS and pressure side pitch angle αP can be varied to suit the tip loading profile of the blade 12 to which the novel tip structure 20 is applied.

In the first tip structure 20 as shown, the pressure side pitch angle αP2 is approximately 1.5° negative and the suction side pitch angle αS2 is approximately 3° positive, giving an overall twist angle αT between the sections in the respective planes P2, S2 of about 4.5°.

A test tip structure was produced in three identical units which were attached as shown in FIGS. 2 and 3 to the tips of the three rotor blades of an otherwise conventional wind turbine similar to that of FIG. 2, referred to hereinafter as the test turbine, which was run in a field test to generate a data set FT. A corresponding data set was generated by running the test turbine before the test tip structures were attached to the blades to generate a baseline data set FB. The test turbine was also modelled in a CFD (computational fluid dynamics) simulation to generate a CFD data set CT for the turbine with the test tip structure fitted to each blade, and a corresponding baseline CFD data set CB for the test turbine without the test tip structures.

Figure 19:
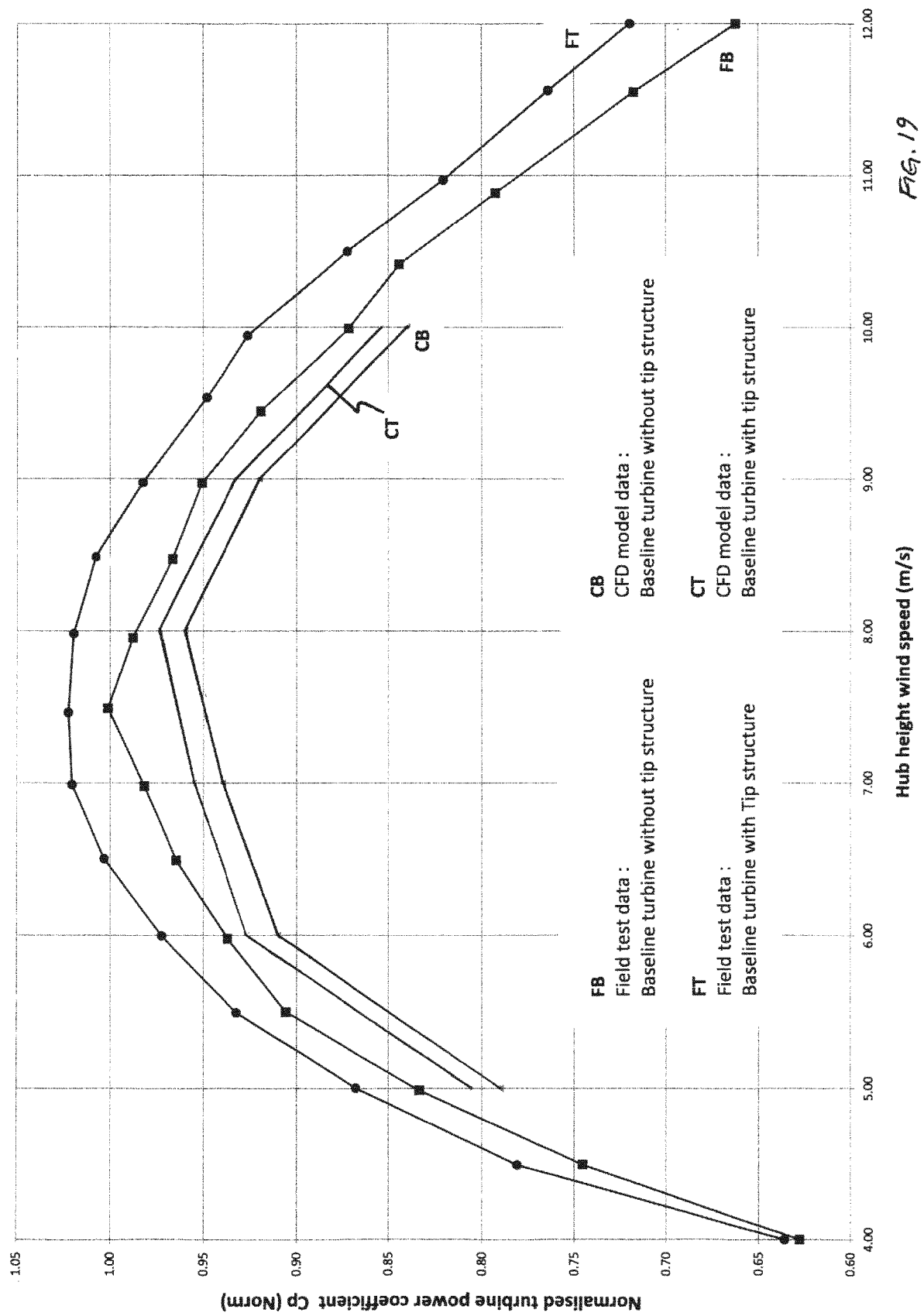
FIG. 19 is a graph of the comparative field test data and CFD simulation data presented in Tables 1, 2, 3 and 4 and representing the power output curve of a 1 MW HAWT (hereinafter referred to as the test turbine) having three blades, each blade fitted with a test tip structure corresponding to the first tip structure.

The four data sets are set out in tables 1-4 and presented in graphic form in FIG. 19 as further discussed below.

TABLE 1

Data set FB
Field test data:
Baseline turbine without tip structure

| Wind speed (m/s) | Cp (Norm) |
|---|---|
| 3.00 | 0.00 |
| 3.58 | 0.48 |
| 4.00 | 0.63 |
| 4.49 | 0.75 |
| 4.99 | 0.83 |
| 5.50 | 0.91 |
| 5.98 | 0.94 |
| 6.49 | 0.96 |
| 6.98 | 0.98 |
| 7.49 | 1.00 |
| 7.95 | 0.99 |
| 8.47 | 0.97 |
| 8.97 | 0.95 |
| 9.45 | 0.92 |
| 9.99 | 0.87 |
| 10.41 | 0.84 |
| 10.88 | 0.79 |
| 11.55 | 0.72 |
| 11.55 | 0.72 |
| 12.00 | 0.66 |

TABLE 2

Data set FT
Field test data:
Baseline turbine with Tip structure

| Wind speed (m/s) | Cp (Norm) |
|---|---|
| 3.17 | 0.24 |
| 3.56 | 0.48 |
| 4.00 | 0.64 |
| 4.49 | 0.78 |
| 5.00 | 0.87 |
| 5.50 | 0.93 |
| 6.00 | 0.97 |
| 6.50 | 1.00 |
| 6.99 | 1.02 |
| 7.46 | 1.02 |
| 7.98 | 1.02 |
| 8.49 | 1.01 |
| 8.97 | 0.98 |
| 9.54 | 0.95 |
| 9.94 | 0.93 |
| 10.50 | 0.87 |
| 10.97 | 0.82 |
| 11.56 | 0.76 |
| 12.00 | 0.72 |
| 12.00 | 0.72 |

TABLE 4

Data set CT
CFD model data:
Baseline turbine with Tip structure

| Wind speed (m/s) | Cp (Norm) |
|---|---|
| 5.00 | 0.81 |
| 6.00 | 0.93 |
| 7.00 | 0.96 |
| 8.00 | 0.97 |
| 9.00 | 0.93 |
| 10.00 | 0.85 |

TABLE 3

Data set CB
CFD model data:
Baseline turbine without tip structure

| Wind speed (m/s) | Cp (Norm) |
|---|---|
| 5.00 | 0.79 |
| 6.00 | 0.91 |
| 7.00 | 0.94 |
| 8.00 | 0.96 |
| 9.00 | 0.92 |
| 10.00 | 0.84 |

The turbine power coefficient Cp is a measure of the power extracted by the turbine as a proportion of the total available power in the wind, defined as $Pm/(0.5 \cdot \rho \cdot V3 \cdot ar)$ wherein Pm is the measured power output of the rotor shaft, $\rho$ is air density, V is the hub height wind speed (i.e. the speed of the wind W1 at the height of the hub), and ar is the area of the rotor.

The normalised turbine power coefficient Cp (Norm) in each data set as shown on the Y-axis of the graph was obtained by dividing the turbine power coefficient Cp at each data point by a reference value, which was selected to be the maximum measured value of Cp from the data underlying data set FB (Field test data: Baseline turbine without tip structure) before normalisation. For this reason Cp (Norm) for data set FB has a peak value of 1.00.

The features of the test tip structure were essentially the same as the features of the first tip structure 20 as discussed above, except that the geometry of the test tip structure was optimised for the blades of the test turbine. In the test tip structure the pressure side pitch angle $\alpha P$ was within the range from 2° positive to 5° negative, and the suction side pitch angle $\alpha S$ was within the range from 2° positive to 9° positive. The overall twist angle $\alpha T$ was 6°. As can be seen from FIG. 20 (Power v Twist), further discussed below, this was found to be the optimal twist angle for the test tip structure when fitted to the test turbine.

Field Test Parameters

The test was conducted to the IEC 61400-12 standard, "Power performance measurements of electricity producing wind turbines" on a 1 MW pitch-regulated variable speed turbine driving a generator connected to the power grid.

The rotor diameter was 61 m, each blade having an overall length of 30.5 m from the axis of rotation Y1, and the blades were pre-bent (swept) at the tip along their length axis L in the rest condition to compensate for deflection at the blade tip under load. The mass of each blade was approximately 3000 kg with the centre of mass at approximately 12 m from the hub, giving an mass moment (I) of 36000 kgm.

The test turbine was equipped with active pitch and yaw control systems. The pitch control system was arranged to adjust the pitch of each blade dependent on its angular position through the rotation cycle of the rotor. The cyclic pitch adjustment compensated for height dependent wind shear so as to reduce variable bending moments across the blades with each revolution of the rotor, as known in the art.

Power was measured at the grid connection by the power electronics system of the turbine generator before entering the grid. All wind conditions (including shear, turbulence, speed, direction) were measured by instruments on an on-site mast situated close to the turbine. All measurements were carried out to IEC standards with a statistically significant data set for each tabulated wind speed.

The turbine was run for a period of 2-3 months without the tip structure to generate the baseline data set FB. After fitting the tip structure to each of the turbine blades as shown in FIG. 2, the turbine was run for a further period of 2-3 months to generate data set FT. There were no significant changes to surrounding ground surface roughness level or other defined test parameters over the period of the tests.

The tip structure used in the field test was configured as shown in FIGS. 5-18 as a retrofit assembly comprising an attachment portion 30 which was arranged to connect to the otherwise conventional rotor blade 12, and the suction and pressure side structures 50, 60 which were filleted into the attachment portion 30 generally as shown.

The tip structure was attached as shown in FIG. 5 by cutting off approximately 200-400 mm of the blade tip and introducing the cut end of the blade 12 into a socket 31 formed in the attachment portion 30 of the tip structure. The attachment portion was configured as a sleeve to fit over the cut distal end of the blade tip, overlapping the blade by about 100 mm to form a joint bonded by adhesive.

The total mass of the retrofit tip structure was 3.5 kg. The estimated mass of the short portion of the blade removed from the tip was about 0.7 kg so that the installation of the test tip structure added a net 2.8 kg to the mass of the blade with the centre of the added mass being positioned about 30.5 m from the axis of rotation, keeping the swept area the same.

CFD Test Parameters

The CFD model was based on a rotor with three static blades (i.e. blades which are fixed in relation to the hub) assuming a fully turbulent boundary layer with free airflow and no wind shear, with key parameters as follows:—

StarCCM+® version 12 was used for the simulation with CATIA® v5 used to generate the input CAD data.

The global domain represented a third of the swept area when viewed in the wind direction W1 and periodic boundary conditions were used to give rotation to the flow.

Cell sizes on the blade surface were defined in the range from 5 mm to 30 mm, with appropriate refinement to capture leading edge curvature in a smooth fashion.

A prism layer mesh was defined from the blade surface to capture boundary layer behaviour (wall y+<1).

A volume mesh refinement area was defined around the blade tip to capture the trailing vortex with higher resolution.

The CFD model was a fully turbulent, steady simulation using the K-Epsilon turbulence model. The K-Omega SST turbulence model was also used with very similar results.

It can be seen that the data set CB generated by the CFD simulation for the baseline test turbine (without tip structure) was a fairly good fit to the corresponding real world data set FB, suggesting that the CFD simulation was a good model for the real world performance of the test turbine.

In addition to the CFD simulation, a wind tunnel scale model test was carried out. The wind tunnel used was of the closed section, closed return type with a nominal test flow speed of 40 m/s. The model used was a 50% scale model of the outer 3 m of the wind turbine blade constructed from an aluminium frame and 3D printed plastic components. The model was mounted to a high precision floor mounted force balance that measured six components, comprising three forces and three moments.

Models were tested with the same geometry as those simulated in CFD, and the trends observed in lift and drag results were in close agreement to the simulated results, giving confidence in the CFD approach.

It should be noted however that the CFD simulation assumed a fully turbulent boundary layer, whereas in real world conditions the surfaces of the blade and tip structure may be expected to exhibit significant amounts of laminar flow, which has a significantly lower skin friction drag than turbulent flow. This could be expected to give rise to at least about 2% greater Cp in the real world field test compared with the CFD simulation, which is reflected by the offset between the data sets CB and FB.

A tip structure or endplate comprising a pressure side structure in combination with a suction side structure when attached to a wingtip or blade tip as generally known in the art may be expected to provide enhanced separation between the pressure fields on the pressure and suction sides of the aerofoil, and so may be expected to deliver relatively lower drag, resulting in a net improvement in the power coefficient.

It may be noted that the expected improvement in Cp resulting from a conventional tip structure or endplate extending from both pressure and suction sides of the blade would be significantly greater than that provided by a conventional winglet or upturned blade tip which extends from only one (pressure or suction) side of the aerofoil as known in the art.

The predictable improvement in Cp resulting from the enhanced separation of the pressure fields by the pressure and suction side structures of the test tip structure is reflected by the difference between the two data sets CB and CT generated in the CFD simulation.

In the field test the turbine fitted with the novel tip structure performed surprisingly better than predicted by the CFD model, the data set FT indicating an increase in the power coefficient Cp of approximately 2.5%-4% when compared with the baseline turbine data set FB. It can be seen that the offset between data sets FB and FT is substantially greater than the offset between data sets CB and CT which reflects the predictable improvement in Cp resulting from separation of the pressure fields by the presence of the pressure and suction side structures.

The 2.5%-4% increase in Cp was calculated to correspond to an increase of approximately 2%-3% in annual energy production (AEP) from the turbine in view of the Weibull curve indicating the windspeed probability distribution for the field test site. Those skilled in the art will appreciate that the annual turbine energy production for each measured windspeed is calculated as the sum of the power output for that windspeed and the proportion of the year over which that windspeed is expected to occur, based on the Weibull curve The sum total annual power output over all measured windspeeds represents the total annual energy production (AEP) for the turbine.

As discussed above with reference to the performance of the blade, the tip structure may similarly perform better in the real world laminar flow condition of the boundary layer compared with the turbulent boundary layer assumed in the CFD model. This difference may be expected to make a contribution to the difference between the measured improvement in Cp between data sets FT and FB, and the relatively smaller improvement predicted by the CFD model in the difference between data sets CT and CB. However, the likely proportion of this contribution may be expected to correspond, at most, to the offset between data sets CB and FB (representing the influence of real world factors in tato over the CFD model), hence a few percentage points, as a proportion of the offset between data sets CB and CT which represent the overall predicted contribution of the tip structure. Thus, the laminar boundary layer condition at the real world tip structure as against the turbulent boundary layer condition of the CFD model may be inferred to contribute, at most, a few hundredths of a percentage point on the Cp(Norm) axis of the graph.

While the invention is not bound by theory, it is believed that the twist angle $\alpha T$ between the pressure and suction side structures may generate an enhanced pressure differential across the radially outward surface of the tip structure resulting in an unexpectedly good binding of the airflow which in turn may be expected to dramatically alter the strength, size, and position of the vortices shed from the tip of the blade. This in turn will change how the turbine wake forms and evolves. Those skilled in the art will appreciate that changes in the size, shape, strength, or position of the wake will have an impact also on the upstream flow conditions, for example, resulting in a small increase in average velocity which contributes to an overall increase in power output.

It is also possible that by increasing the lift generated at the tip of the blade, the novel tip structure may have the effect of straightening the blades (in rotors either with or without blade pre-bend). The straighter blades may have the effect of slightly increase the swept area in use, which will increase the power output of the rotor.

The test site was unusual in that wind from one direction only was masked by a stand of tall trees, but flowed over flat ground from all other directions. The trees produced strong wind shear which would be expected to reduce power output to well below the level predicted by the CFD simulation which did not take account of wind shear.

However, the test results showed the power output during periods when the wind was from the direction of the treeline was equal to that predicted by the CFD study for free airflow. During periods when the wind was from any other direction, hence over flat ground, the performance was significantly better than predicted by the CFD study, as indicated by the field test data sets (FB, FT) which show aggregate data for all wind directions experienced during the test including from the direction of the treeline.

An analysis of the measured power output for different wind directions suggests that the novel tip structure not only provides surprisingly improved performance in free airflow but also performs surprisingly well in conditions of severe wind shear and turbulence.

Again, while the invention is not bound by theory, it is believed that by increasing the tip loading and changing the structure of the tip vortex, the turbine blades equipped with the novel tip structure may exhibit less dynamic twisting or deflection in the turbulent wind field, again increasing the power output because the aerofoils remain closer to the optimal angle of attack.

Further advantageously, the enhanced binding of the airflow and reduced vortex formation at the novel tip structure may provide a relatively more confined wake or stream tube downstream of the turbine. This in turn may be expected to increase the available power density and so improve the performance of further wind turbines arranged in the downstream region.

Thus, by equipping each of the wind turbines with the novel tip structure, the invention may improve the overall power output of a windfarm 80 relative to its total land area. Referring to FIG. 4, the windfarm comprises a plurality of wind turbines 10, each comprising a rotor having at least one blade equipped with the novel tip structure which is arranged to extract energy from the wind W1. The wind turbines are arranged respectively upstream and downstream of one another with respect to the direction of the wind as shown by the arrows W1 so that the restricted stream tube of each turbine results in an aggregate increase in the power output of the turbines.

Advantageously, and as described and illustrated with reference to the first tip structure 20, the novel tip structure may have a relatively sharp angular transition between the blade (or the connection portion of the retrofit tip structure) and the pressure and suction side structures 50, 60. That is to say, the transition may be smoothly filleted as well known in the art, but the fillet 48 may be of relatively small radius so as to provide a clearly evident transition region between the wetted surfaces of the pressure and suction side structures 50, 60 and the surfaces of the blade 12.

The transition region is more distinct and localised, for example, than the corresponding region of a prior art upturned blade tip or winglet which has constant curvature so that it deviates progressively and smoothly from the length axis of the blade all the way to the tip.

The more localised and clearly evident transition region maximises the proportion of the overall surface area of the tip structure which is oriented in the direction required to generate the desired vector forces which give rise to the airflow pattern as explained above. Thus, relative to its size and compared with a more gradually and progressively curved blade tip, the novel tip structure may have a more pronounced binding effect on the airflow around the end of the blade.

The relatively small overall size of the tip structure means that it may be relatively light in weight when compared with the forces it generates it use.

A corollary of the relatively clearly marked transition region is that any angular discontinuity will introduce a potential source of drag, and so the drag penalty of the transition region must be balanced against the advantageously enhanced aerodynamic effect of the tip structure relative to its overall size and mass.

FIG. 20 (Power v Twist) illustrates how the increase in turbine power coefficient Cp of the test turbine obtained from the novel tip structure varies with the twist angle $\alpha T$.

The graph presents a data set derived from a CFD simulation with the same parameters used to produce data sets CB and CT (Tables 3 and 4), assuming a wind speed of 7 m/s and a rotational speed of 20 RPM for the rotor of the test turbine. The simulation modelled the same test tip structure attached to the test turbine as for data set CT, except that the twist angle $\alpha T$ was varied, with the respective pressure side and suction side pitch angles $\alpha P$, $\alpha S$ being optimised for each selected value of $\alpha T$.

The value $\alpha T$ (°) on the X-axis of the graph is the value of the twist angle $\alpha T$ in degrees.

The value $\Delta Cp$ (%) on the Y-axis is the calculated increase in turbine power coefficient Cp generated by the tip structure as a percentage of the calculated increase in turbine power coefficient Cp obtained at zero twist angle ($\alpha T=0°$).

The calculated increase in turbine power coefficient Cp at the optimal twist angle $\alpha T=6°$ corresponds to the difference between data sets CT and CB (Tables 3 and 4) at the 7.00 m/s data point in the earlier described simulation.

The peak value $\Delta Cp$ of approximately 128% indicates that the calculated increase in turbine power coefficient Cp at the optimal twist angle $\alpha T=6°$ was about 128% of the calculated increase in turbine power coefficient Cp generated by the test tip structure with zero twist angle ($\alpha T=0°$).

It can be seen that the twist angle $\alpha T$ is an important determinant of the power output of the tip structure.

FIG. 21 (Power v. Area) shows two CFD data sets generated by a CFD simulation with the same parameters used to produce data sets CB and CT (Tables 3 and 4), assuming a wind speed of 7 m/s and a rotational speed of 20 RPM for the rotor of the test turbine.

The first data set ($\alpha T=6°$) was based on the same test tip structure attached to the test turbine with the same geometry as for data set CT (including the twist angle $\alpha T$ of 6°). The data set was generated by varying the overall size of the test tip structure without changing its geometry.

The second data set ($\alpha T=0°$) was based on the same parameters as the first data set, but with the test tip structure modified to align the pressure and suction side structures to provide zero twist angle ($\alpha T=0°$). The respective pressure side and suction side pitch angles $\alpha P$, $\alpha S$ were thus equal and were optimised for this condition. Again, the data set was generated by varying the overall size of the modified test tip structure with zero twist angle without otherwise changing its geometry.

The value Pa+Sa (%) on the X-axis of the graph is the combined projected area Pa and Sa of the pressure and suction side structures in the respective, pressure side and suction side reference planes Pref, Sref (FIG. 7) as a percentage of the combined projected area Pa+Sa of the test tip structure on which data set CT (Table 4) was based.

Thus, the minimum value of 100 indicates a combined projected area Pa+Sa equal to that of the test tip structure, and the value of 200 indicates a combined projected area Pa+Sa double that of the test tip structure.

The value $\Delta Cp$ (%) on the Y-axis is the calculated increase in turbine power coefficient Cp generated by the tip structure as a percentage of the respective baseline value.

For the first data set ($\alpha T=6°$) the baseline value was the calculated increase in turbine power coefficient Cp obtained from the test tip structure, corresponding to the difference between data sets CT and CB (Tables 3 and 4) at the 7.00 m/s data point in the earlier described simulation.

Thus, for the first data set ($\alpha T=6°$) the value $\Delta Cp=100\%$ indicates an increase in turbine power coefficient Cp equal to that obtained from the test tip structure, hence equal to the difference between data sets CT and CB (Tables 3 and 4) at the 7.00 m/s data point.

For the second data set ($\alpha T=0°$) the baseline value was the calculated increase in turbine power coefficient Cp obtained from the modified test tip structure with zero twist angle ($\alpha T=0°$) and a combined projected area Pa+Sa equal to that of the test tip structure, hence the value of 100% on both X and Y axes.

The peak value $\Delta Cp$ for the first data set ($\alpha T=6°$) indicates that the increase in turbine power coefficient Cp at the optimal twist angle $\alpha T=6°$ can be optimised at about 132% of the increase obtained from the test tip structure used in the first simulation (data set CT, Table 4) by increasing the combined projected area Pa+Sa to about 142% of that of the test tip structure.

The second data set shows that a comparable value can be obtained from the tip structure with zero twist angle ($\alpha T=0°$) only by increasing its combined projected area Pa+Sa to about double that of the test tip structure.

The mass of the tip structure reflects its structural characteristics which must be adequate to transfer the applied loads to the blade. Mass will increase not only with the applied load but also as a non-linear function of overall size, since the same applied loads will generate a greater moment in a larger structure. Thus, an increase in area will result in a proportionately much larger increase in mass which reflects the additional materials together with the increased design loads on the tip structure which in turn require a thicker skin material.

In the earlier described field test (data sets FB and FT, Tables 1 and 2), the additional mass moment of each test tip structure when fitted to the test turbine was 2.8 kg·30.5 m=85.4 kgm, only 0.24% of the original mass moment of the blade without the tip structure.

In practice, it may be estimated that doubling the area of the tip structure with zero twist angle ($\alpha T=0°$) represented by the second data set of FIG. 21 (Power v. Area) to the Pa+Sa=200% data point would increase the mass of the tip structure by around 6 times. Based on the 3.5 kg mass of the test tip structure this would equate to a mass of 6·3.5=21 kg for the tip structure less the 0.7 kg removed from the blade tip of the test turbine, so a total additional mass of 20.3 kg. In the example of the field test this would amount to an additional mass moment of about 619 kgm for each tip structure, which at about 1.72% of the original mass moment of the test turbine blade without the tip structure would significantly affect the overall turbine loading, resulting in a net loss on the key measure of mass efficiency P/I.

Taking the example of the 1 MW test turbine, a normalised baseline figure for the mass efficiency P/I of each blade before fitting the novel tip structure can be calculated as $1·10^6/36000$ kgm=27.78.

Based on an expected average value of 1.5% for the increase in the normalised turbine power coefficient Cp (Norm) as indicated by the difference between the CFD data sets CB and CT (Tables 3 and 4), the same blade when fitted with the test tip structure with optimal twist angle ($\alpha T=0°$) would be expected to provide a moderately higher mass efficiency P/I of $1.015·10^6/36085=28.13$.

Taking the same average value of 1.5% for the increase in Cp (Norm), the same blade when fitted with the modified tip structure with zero twist angle ($\alpha T=0°$) but double the area would be expected to provide a reduced mass efficiency P/I of $1.015·10^6/36619=27.72$.

The difference between data sets FB and FT is more difficult to average in view of the different measured windspeed data points. However, a data point occurs at 8.97 m/s in both data sets and can be seen from the graph (FIG. 19) to be broadly representative of the difference in performance across the measured range. For this data point the increase in Cp (Norm) between the two data sets (0.98 v. 0.95) was 3.0%.

Taking this value of 3% to reflect the surprisingly better real world performance of the test tip structure in the field test, the novel tip structure when fitted to the blade of the test turbine and with the twist angle optimised for the blade at $\alpha T=6°$ would be expected to provide a significantly higher mass efficiency P/I of $1.03·10^6/36085=28.54$.

The novel tip structure can be used for example to increase the power output of a turbine without changing the blade length, either at the design stage or as a retrofit, for example, for an existing turbine which was rated for a higher class than is required for its actual or intended site location.

It can be inferred that similar benefits may be obtained from the novel tip structure in other applications, particularly when fitted to a blade which rotates about an axis with a similar form factor to that of a HAWT rotor blade.

Thus, the invention may be applied to obtain a rotor having at least one blade configured as an aerofoil, wherein the novel tip structure is fitted to the blade or each blade 12 of the rotor as shown in FIG. 3 and FIG. 5. The rotor comprising the blade 12 (FIG. 3, FIG. 5) may be the rotor of a MW, kW or micro class wind turbine, particularly a HAWT, or the rotor of a helicopter, or an aircraft propeller.

Performance benefits may also be obtained when the novel tip structure is fitted to the tip of the wing or primary lifting surface of an aircraft, for example, as shown in FIG. 3 and FIG. 5 wherein the aerofoil 12 comprises the wing or primary lifting surface. Thus, the novel tip structure may be applied to provide an aircraft having at least one aerofoil 12 (for example, the blade of a propeller or a wing or a canard or horizontal or vertical tailplane of a fixed wing aircraft) equipped with the novel tip structure.

From the data presented above it will be understood that the invention may further be applied to provide a method of improving a mass efficiency P/I of a rotor comprising at least one blade, the blade comprising an aerofoil, wherein P is an average output shaft power produced by the rotor over a target windspeed range and I is a mass moment of inertia of the rotor, by arranging the novel tip structure as described above at a free end region of the or each of the blades.

It is found that good performance may be obtained where the projected profile 51 of the pressure side structure 50 and the projected profile 61 of the suction side structure 60 converge forwardly with respect to the direction of motion (D) to define a projected profile 70' of a forwardly pointing leading edge 70 of the tip structure. The trailing edge 71 of the tip structure may be bifurcated so that it tapers to a point 56, 66 at the tip (in the height dimension hP, hS) of each of the pressure and suction side structures, as shown. These features can be seen in first tip structure 20 and in the variant tip structure 21 (FIG. 3) and were present in the test tip structure.

FIGS. 22-25 show variant tip structures 22, 23, 24 and 25, all generally similar to the first tip structure 20 and including a forwardly pointed leading edge 70 and bifurcated trailing edge 71.

In the tip structure 22 (FIG. 22) the trailing edge 71 of the pressure side structure 50 is somewhat extended to define a more pronounced bifurcation. The view is taken through the blade 12 of the HAWT rotor on which the tip structure 22 is mounted as shown in FIGS. 2 and 3, with the blade 12 being shown in section.

Additional features such as vortex generators or a serrated trailing edge as known in the art may be applied to the novel tip structure to help maintain an attached airflow, allowing an increased angle of attack before the respective aerofoil stalls. This in turn may make it possible to provide a larger twist angle $\alpha T$ between the pressure and suction side structures 50, 60 which further increases the pressure differential between the inwardly facing sides of the pressure side structure and suction side structure and so enhances the improvement in efficiency delivered by the novel aerofoil, particularly in mass efficiency P/I when used as a rotor blade in a HAWT.

By way of example, FIG. 23 shows another embodiment of the novel tip structure with a serrated trailing edge 71, viewed from the same direction as FIG. 22. A serrated or furrowed trailing edge or a trailing edge with rivulets may mitigate noise emission resulting from increased lift (loading) on the tip structure 23, typically associated with increased thickness of the trailing edge boundary layer.

Figure 24:
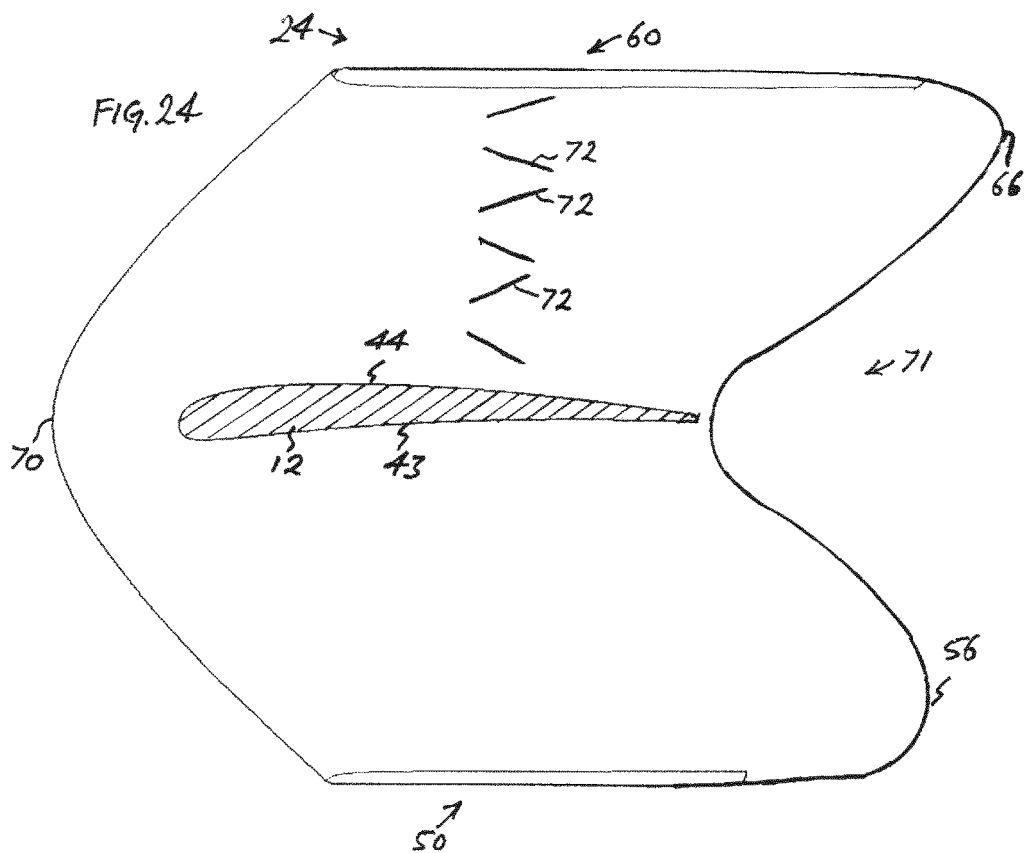

FIG. 24 is a similar view showing yet another embodiment of the novel tip structure 24 equipped with vortex generators 72. The addition of vortex generators may increase the angle of attack at which the aerofoil section of the respective pressure side or suction side structure will stall, allowing an increased twist angle αT without giving rise to flow separation and the associated loss in performance. The vortex generators 72 may comprise small blades as known in the art which may be arranged to extend outwardly, typically from the respective suction surface as shown, on one or both of the suction and pressure side structures.

Figure 25:
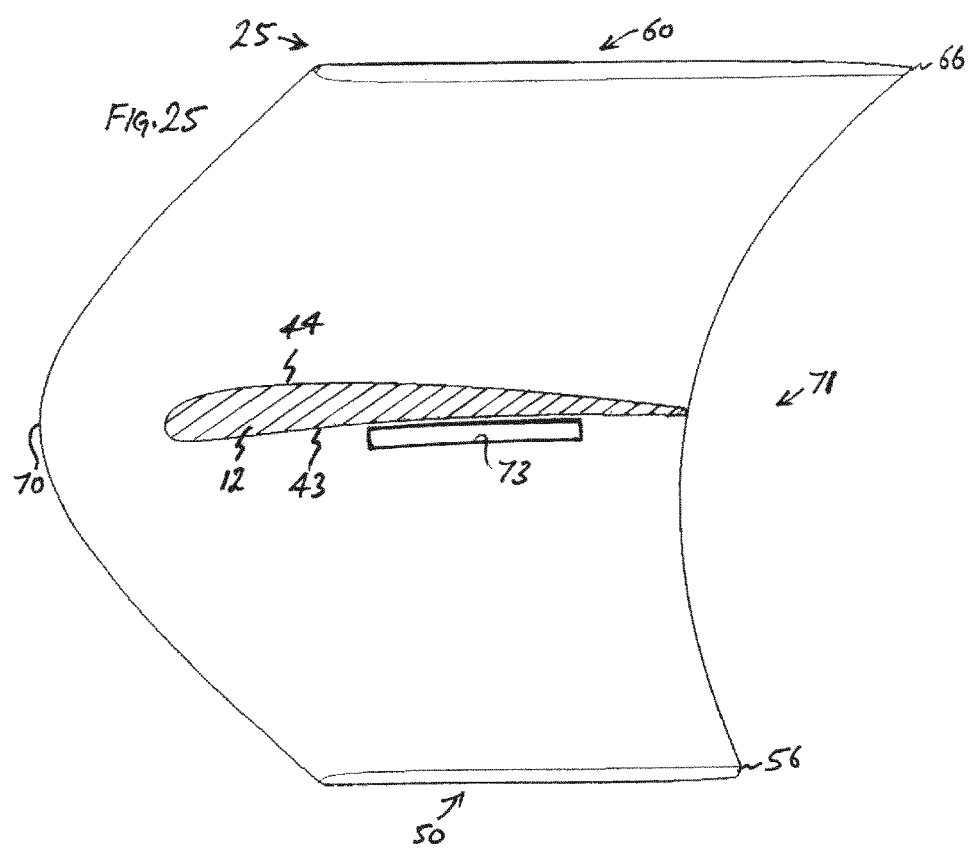

FIG. 25 is a similar view showing yet another embodiment of the novel tip structure 25 equipped with a louvre 73. A louvre comprises an aperture, which may be configured as a slot as in the illustrated example, between the suction and pressure surfaces of an aerofoil. By arranging a louvre or louvres to bleed pressure between the respective suction and pressure surfaces of the tip structure, the pressure differential generating a shed vortex may be reduced, so reducing induced drag.

The novel tip structure may incorporate an integrated lightning protection system comprising e.g. metallic inserts or foils to form a conductive pathway from the tower to the tip structure. Further features may be included as generally known in the art of aerofoil design and construction, for example, feathered edges and the like.

If desired, the attachment portion of a retrofit tip structure may be configured as an aerofoil to extend the overall rotor diameter of the rotor, alternatively, it may be configured to maintain the original diameter of the rotor after cutting the tip of the blade to attach the tip structure, as shown in the example of FIG. 5.

In summary, preferred embodiments provide a tip structure which may be arranged for example on a rotor blade 12 of a HAWT 10. The tip structure comprises a pressure side structure 50 arranged on a pressure side 43 of the blade, and a suction side structure 60 arranged on a suction side 44 of the blade 12. The pressure side and suction side structures 50, 60 have different pitch angles αP, αS so that the chord CP2 of the pressure side structure 50 extends forwardly in the direction of motion D and relatively more radially outwardly away from the blade root, or less radially inwardly towards the blade root, than the chord CS2 of the suction side structure 60, defining a relative twist angle αT between the two structures 50, 60.

Those skilled in the art will recognise that many further adaptations are possible within the scope of the claims.

In the claims, reference characters and numerals are provided in parentheses purely for ease of reference, and should not be construed as limiting features.

The invention claimed is:

1. A tip structure for use in a use position at a free end region of an aerofoil,
the aerofoil extending along a length axis from the free end region to an opposite, supported end region,
the aerofoil being mounted in use at the supported end region for motion in a direction of motion in an airflow relative to the aerofoil, the airflow at the free end region being opposed to the direction of motion,
wherein if the airflow is generated by rotation of the aerofoil about an axis of rotation, then the direction of motion is defined as a tangent of a swept circle at the tip structure, the swept circle defined by rotation of the tip structure about the axis of rotation;
wherein, when considered in section in a section plane normal to the length axis, the aerofoil defines a profile having a maximum length dimension defined by a chord (Cref, Ci), the chord being a straight line having a length between a leading edge point on the profile and a trailing edge point on the profile;
the profile extending between the leading edge point and the trailing edge point on a first, pressure side of the aerofoil and a second, suction side of the aerofoil, the profile being configured to generate a reduced pressure on the suction side relative to the pressure side when the aerofoil is arranged in use in the airflow with the leading edge point upstream of the trailing edge point;
the length axis being defined as a line extending through an axis point on the chord in every position of the section plane from the free end region to the supported end region of the aerofoil, the axis point being located at 25% of the length of the chord from the leading edge point;
wherein a respective said section plane at the free end region of the aerofoil is defined as a first reference plane, and the chord of the aerofoil lying in the first reference plane is defined as a reference chord;
a first pressure side plane containing the reference chord is defined at an angle from 75° to 90° relative to the first reference plane; and
a first suction side plane containing the reference chord is defined at an angle from 75° to 90° relative to the first reference plane;
the tip structure comprising a pressure side structure extending from the pressure side of the aerofoil, and a suction side structure extending from the suction side of the aerofoil;
wherein, when considered in the use position:
the pressure side structure, when considered in section in a second pressure side plane parallel with the first pressure side plane, defines a profile having a maximum length dimension defined by a chord, the chord being a straight line between a leading edge point on the profile and a trailing edge point on the profile, the leading edge point being upstream of the trailing edge point with respect to the airflow, and
the suction side structure, when considered in section in a second suction side plane parallel with the first suction side plane, defines a profile having a maximum length dimension defined by a chord, the chord being a straight line between a leading edge point on the profile and a trailing edge point on the profile, the leading edge point being upstream of the trailing edge point with respect to the airflow; and
wherein, when the direction of motion is represented by a straight line respectively in the second pressure side plane and in the second suction side plane:
when considered in the second pressure side plane, the chord of the pressure side structure extends at an angle αP relative to the direction of motion;
when considered in the second suction side plane, the chord of the suction side structure extends at an angle αS relative to the direction of motion; and
the angle αP is less positive or more negative than the angle αS,
wherein the angle αP or αS is defined as positive where the respective chord extends forwardly and towards the supported end region with respect to the direction of motion, and as negative where the respective chord extends forwardly and away from the supported end region with respect to the direction of motion.

2. A tip structure according to claim 1, wherein the angle $\alpha P$ is at least 3° less positive or more negative than the angle $\alpha S$.

3. A tip structure according to claim 1, wherein the angle $\alpha P$ is from 2° positive to 5° negative, and the angle $\alpha S$ is from 2° positive to 9° positive.

4. A tip structure according to claim 1, wherein the angle $\alpha S$ is positive and the angle $\alpha P$ is negative, and the angle $\alpha S$ is greater than the angle $\alpha P$.

5. A tip structure according to claim 1, wherein
a suction side reference plane containing the reference chord is defined as normal to the first suction side plane; and
when the suction side structure is projected in a direction normal to the suction side reference plane to define a projected profile in the suction side reference plane, the projected profile of the suction side structure defining a total area Sa on one side of the first suction side plane and bounded by the suction side of the aerofoil:
the angle $\alpha S$ is positive when the second suction side plane intersects the suction side reference plane anywhere in a region comprising at least 50% of the area Sa.

6. A tip structure according to claim 1 wherein
a pressure side reference plane containing the reference chord is defined as normal to the first pressure side plane, and
when the pressure side structure is projected in a direction normal to the pressure side reference plane to define a projected profile in the pressure side reference plane,
the projected profile of the pressure side structure defining a total area Pa on one side of the first pressure side plane and bounded by the pressure side of the aerofoil:
the angle $\alpha P$ is negative when the second pressure side plane intersects the pressure side reference plane anywhere in a region comprising at least 50% of the area Pa.

7. A tip structure according to claim 1 wherein
a pressure side reference plane containing the reference chord is defined as normal to the first pressure side plane, and
a suction side reference plane containing the reference chord is defined as normal to the first suction side plane, and
when the pressure side structure is projected in a direction normal to the pressure side reference plane to define a projected profile in the pressure side reference plane, and
the suction side structure is projected in a direction normal to the suction side reference plane to define a projected profile in the suction side reference plane,
the projected profile of the pressure side structure defining a total area Pa on one side of the first pressure side plane and bounded by the pressure side of the aerofoil,
the projected profile of the suction side structure defining a total area Sa on one side of the first suction side plane and bounded by the suction side of the aerofoil:
the angle $\alpha P$ is less positive or more negative than the angle $\alpha S$ when the second pressure side plane intersects the pressure side reference plane anywhere in a region comprising at least 50% of the area Pa and the second suction side plane intersects the suction side reference plane anywhere in a region comprising at least 50% of the area Sa.

8. A tip structure according to claim 1 wherein
a pressure side reference plane containing the reference chord is defined as normal to the first pressure side plane, and
a suction side reference plane containing the reference chord is defined as normal to the first suction side plane, and
when the pressure side structure is projected in a direction normal to the pressure side reference plane to define a projected profile in the pressure side reference plane, and
the suction side structure is projected in a direction normal to the suction side reference plane to define a projected profile in the suction side reference plane,
the projected profile of the pressure side structure defining a total area Pa on one side of the first pressure side plane and bounded by the pressure side of the aerofoil,
the projected profile of the suction side structure defining a total area Sa on one side of the first suction side plane and bounded by the suction side of the aerofoil:
the angle $\alpha P$ is from 2° positive to 5° negative and the angle $\alpha S$ is from 2° positive to 9° positive when the second pressure side plane intersects the pressure side reference plane anywhere in a region comprising at least 50% of the area Pa and the second suction side plane intersects the suction side reference plane anywhere in a region comprising at least 50% of the area Sa.

9. A tip structure according to claim 1, wherein
a pressure side reference plane containing the reference chord is defined as normal to the first pressure side plane, and
a suction side reference plane containing the reference chord is defined as normal to the first suction side plane; and,
when the pressure side structure is projected in a direction normal to the pressure side reference plane to define a projected profile in the pressure side reference plane, and
the suction side structure is projected in a direction normal to the suction side reference plane to define a projected profile in the suction side reference plane,
the projected profile of the pressure side structure defining a total area Pa on one side of the first pressure side plane and bounded by the pressure side of the aerofoil,
the projected profile of the suction side structure defining a total area Sa on one side of the first suction side plane and bounded by the suction side of the aerofoil; and
an intermediate axis point is defined on the length axis at a straight line distance within a range from 300 mm to 700 mm from a terminal axis point defining a distal end of the aerofoil, the terminal axis point being that axis point furthest from the supported end region,
the chord of the aerofoil passing through the intermediate axis point having a length C1 between the respective leading edge point and trailing edge point of the aerofoil:

$$(Pa+Sa) \leq (3 \cdot C1)^2.$$

10. A tip structure according to claim 1, wherein
each of the pressure side structure and the suction side structure is configured as a respective aerofoil having a pressure side and a suction side configured to generate a reduced pressure on the suction side relative to the pressure side when the tip structure is arranged in use in the airflow;

the pressure side of the aerofoil of the pressure side structure and the suction side of the aerofoil of the suction side structure facing generally towards the supported end region when considered with respect to a direction of the length axis;

the suction side of the aerofoil of the pressure side structure and the pressure side of the aerofoil of the suction side structure facing generally away from the supported end region when considered with respect to a direction of the length axis.

11. A tip structure according to claim 1 wherein a pressure side reference plane containing the reference chord is defined as normal to the first pressure side plane, and a suction side reference plane containing the reference chord is defined as normal to the first suction side plane; and, when the pressure side structure is projected in a direction normal to the pressure side reference plane to define a projected profile in the pressure side reference plane, and the suction side structure is projected in a direction normal to the suction side reference plane to define a projected profile in the suction side reference plane, the projected profile of the pressure side structure extending to a maximum distance Pd from the first pressure side plane, the projected profile of the suction side structure extending to a maximum distance Sd from the first suction side plane:

$Sd > Pd.$

12. A tip structure according to claim 1, wherein a third suction side plane is defined in parallel with and between the first and second suction side planes, and the suction side structure, when considered in section in the third suction side plane, defines a profile having a maximum length dimension defined by a chord, the chord being a straight line between a leading edge point on the profile and a trailing edge point on the profile, the leading edge point being upstream of the trailing edge point with respect to the airflow; and wherein, when the direction of motion is represented as a straight line respectively in each of the second and third suction side planes:

the chord of the suction side structure extends in the second suction side plane at an angle $\alpha S2$ relative to the direction of motion, and in the third suction side plane at an angle $\alpha S3$ relative to the direction of motion, and the angle $\alpha S3$ is less positive or more negative, or less negative or more positive, than the angle $\alpha S2$, wherein the angle $\alpha S2$ or $\alpha S3$ is defined as positive where the respective chord extends forwardly and towards the supported end region with respect to the direction of motion, and as negative where the respective chord extends forwardly and away from the supported end region with respect to the direction of motion.

13. A tip structure according to claim 1, wherein a third pressure side plane is defined in parallel with and between the first and second pressure side planes, and the pressure side structure, when considered in section in the third pressure side plane, defines a profile having a maximum length dimension defined by a chord, the chord being a straight line between a leading edge point on the profile and a trailing edge point on the profile, the leading edge point being upstream of the trailing edge point with respect to the airflow; and wherein, when the direction of motion is represented as a straight line respectively in each of the second and third pressure side planes:

the chord of the pressure side structure extends in the second pressure side plane at an angle $\alpha P2$ relative to the direction of motion, and in the third pressure side plane at an angle $\alpha P3$ relative to the direction of motion, and the angle $\alpha P3$ is more positive or less negative, or more negative or less positive, than the angle $\alpha P2$, wherein the angle $\alpha P2$ or $\alpha P3$ is defined as positive where the respective chord extends forwardly and towards the supported end region with respect to the direction of motion, and as negative where the respective chord extends forwardly and away from the supported end region with respect to the direction of motion.

14. A tip structure according to claim 1, wherein a pressure side reference plane containing the reference chord is defined as normal to the first pressure side plane, and a suction side reference plane containing the reference chord is defined as normal to the first suction side plane; and, when the pressure side structure is projected in a direction normal to the pressure side reference plane to define a projected profile in the pressure side reference plane, and the suction side structure is projected in a direction normal to the suction side reference plane to define a projected profile in the suction side reference plane:

the projected profile of the pressure side structure and the projected profile of the suction side structure converge forwardly with respect to the direction of motion to define a projected profile of a forwardly pointing leading edge of the tip structure.

15. A tip structure according to claim 1 and including at least one attachment portion, the attachment portion being attachable to a free end region of an aerofoil to form an assembly.

16. A rotor blade comprising an aerofoil and further comprising a tip structure according to claim 1.

17. A wind turbine comprising a rotor having at least one blade according to claim 16.

18. A wind farm comprising a plurality of wind turbines arranged to extract energy from a wind, the wind turbines being arranged respectively upstream and downstream of one another with respect to a direction of the wind, each wind turbine comprising a rotor having at least one blade according to claim 16.

19. A helicopter comprising a rotor having at least one blade according to claim 16.

20. An aircraft comprising at least one aerofoil, the aerofoil having a tip structure according to claim 1.

21. A method of improving a mass efficiency P/I of a rotor of a wind turbine;

the rotor comprising at least one blade, the blade comprising an aerofoil;

wherein P is an average output shaft power produced by the rotor over a target windspeed range, and I is a mass moment of inertia of the rotor;

the method comprising:

providing a tip structure according to claim 1; and arranging the tip structure at a free end region of the aerofoil.

22. A tip structure for use in a use position at a free end region of an aerofoil of a rotor blade of a wind turbine, the aerofoil extending along a length axis from the free end region to an opposite, supported end region, the aerofoil being mounted in use at the supported end region for motion in a direction of motion in an airflow relative to the aerofoil, the airflow at the free end region being opposed to the direction of motion, wherein the airflow is generated by rotation of the aerofoil about an axis of rotation, and the direction of motion is defined as a tangent of a swept circle at the tip structure, the swept circle defined by rotation of the tip structure about the axis of rotation;

wherein, when considered in section in a section plane normal to the length axis, the aerofoil defines a profile having a maximum length dimension defined by a chord, the chord being a straight line having a length between a leading edge point on the profile and a trailing edge point on the profile;

the profile extending between the leading edge point and the trailing edge point on a first, pressure side of the aerofoil and a second, suction side of the aerofoil, the profile being configured to generate a reduced pressure on the suction side relative to the pressure side when the aerofoil is arranged in use in the airflow with the leading edge point upstream of the trailing edge point;

the length axis being defined as a line extending through an axis point on the chord in every position of the section plane from the free end region to the supported end region of the aerofoil, the axis point being located at 25% of the length of the chord from the leading edge point;

wherein a respective said section plane at the free end region of the aerofoil is defined as a first reference plane, and the chord of the aerofoil lying in the first reference plane is defined as a reference chord;

a first pressure side plane containing the reference chord is defined at an angle from 75° to 90° relative to the first reference plane; and a first suction side plane containing the reference chord is defined at an angle from 75° to 90° relative to the first reference plane;

the tip structure comprising a pressure side structure extending from the pressure side of the aerofoil, and a suction side structure extending from the suction side of the aerofoil;

wherein, when considered in the use position:

the pressure side structure, when considered in section in a second pressure side plane parallel with the first pressure side plane, defines a profile having a maximum length dimension defined by a chord, the chord being a straight line between a leading edge point on the profile and a trailing edge point on the profile, the leading edge point being upstream of the trailing edge point with respect to the airflow, and the suction side structure, when considered in section in a second suction side plane parallel with the first suction side plane, defines a profile having a maximum length dimension defined by a chord, the chord being a straight line between a leading edge point on the profile and a trailing edge point on the profile, the leading edge point being upstream of the trailing edge point with respect to the airflow; and wherein, when the direction of motion is represented by a straight line respectively in the second pressure side plane and in the second suction side plane:

when considered in the second pressure side plane, the chord of the pressure side structure extends at an angle $\alpha P$ relative to the direction of motion;

when considered in the second suction side plane, the chord of the suction side structure extends at an angle $\alpha S$ relative to the direction of motion; and the angle $\alpha P$ is less positive or more negative than the angle $\alpha S$, wherein the angle $\alpha P$ or $\alpha S$ is defined as positive where the respective chord extends forwardly and towards the supported end region with respect to the direction of motion, and as negative where the respective chord extends forwardly and away from the supported end region with respect to the direction of motion; wherein at least one aperture is formed in the tip structure between respective suction and pressure surfaces of the tip structure.

23. A method of improving a mass efficiency P/I of a rotor of a wind turbine;

the rotor comprising at least one blade, the blade comprising an aerofoil;

wherein P is an average output shaft power produced by the rotor over a target windspeed range, and I is a mass moment of inertia of the rotor;

the method comprising:

providing a tip structure according to claim 22; and arranging the tip structure at a free end region of the aerofoil.

24. A tip structure for use in a use position at a free end region of an aerofoil of a rotor blade of a wind turbine, the aerofoil extending along a length axis from the free end region to an opposite, supported end region, the aerofoil being mounted in use at the supported end region for motion in a direction of motion in an airflow relative to the aerofoil, the airflow at the free end region being opposed to the direction of motion, wherein the airflow is generated by rotation of the aerofoil about an axis of rotation, and the direction of motion is defined as a tangent of a swept circle at the tip structure, the swept circle defined by rotation of the tip structure about the axis of rotation;

wherein, when considered in section in a section plane normal to the length axis, the aerofoil defines a profile having a maximum length dimension defined by a chord, the chord being a straight line having a length between a leading edge point on the profile and a trailing edge point on the profile;

the profile extending between the leading edge point and the trailing edge point on a first, pressure side of the aerofoil and a second, suction side of the aerofoil, the profile being configured to generate a reduced pressure on the suction side relative to the pressure side when the aerofoil is arranged in use in the airflow with the leading edge point upstream of the trailing edge point;

the length axis being defined as a line extending through an axis point on the chord in every position of the section plane from the free end region to the supported end region of the aerofoil, the axis point being located at 25% of the length of the chord from the leading edge point;

wherein a respective said section plane at the free end region of the aerofoil is defined as a first reference plane, and the chord of the aerofoil lying in the first reference plane is defined as a reference chord;

a first pressure side plane containing the reference chord is defined at an angle from 75° to 90° relative to the first reference plane; and a first suction side plane containing the reference chord is defined at an angle from 75° to 90° relative to the first reference plane;

the tip structure comprising a pressure side structure extending from the pressure side of the aerofoil, and a suction side structure extending from the suction side of the aerofoil;

wherein, when considered in the use position:

the pressure side structure, when considered in section in a second pressure side plane parallel with the first pressure side plane, defines a profile having a maximum length dimension defined by a chord, the chord being a straight line between a leading edge point on the profile and a trailing edge point on the profile, the leading edge point being upstream of the trailing edge point with respect to the airflow, and the suction side structure, when considered in section in a second suction side plane parallel with the first suction side plane, defines a profile having a maximum length dimension defined by a chord, the chord being a straight line between a leading edge point on the profile and a trailing edge point on the profile, the leading edge point being upstream of the trailing edge point with respect to the airflow; and wherein, when the direction of motion is represented by a straight line respectively in the second pressure side plane and in the second suction side plane:

when considered in the second pressure side plane, the chord of the pressure side structure extends at an angle $\alpha P$ relative to the direction of motion;

when considered in the second suction side plane, the chord of the suction side structure extends at an angle $\alpha S$ relative to the direction of motion; and the angle $\alpha P$ is less positive or more negative than the angle $\alpha S$, wherein the angle $\alpha P$ or $\alpha S$ is defined as positive where the respective chord extends forwardly and towards the supported end region with respect to the direction of motion, and as negative where the respective chord extends forwardly and away from the supported end region with respect to the direction of motion; wherein the tip structure includes a serrated or furrowed trailing edge or a trailing edge with rivulets.

25. A method of improving a mass efficiency P/I of a rotor of a wind turbine;

the rotor comprising at least one blade, the blade comprising an aerofoil;

wherein P is an average output shaft power produced by the rotor over a target windspeed range, and I is a mass moment of inertia of the rotor;

the method comprising: providing a tip structure according to claim 24; and arranging the tip structure at a free end region of the aerofoil.

* * * * *